United States Patent
Pastrick

(10) Patent No.: US 8,393,766 B2
(45) Date of Patent: Mar. 12, 2013

(54) LIGHTED EXTERIOR MIRROR ASSEMBLY FOR VEHICLE

(75) Inventor: Todd W. Pastrick, Spring Lake, MI (US)

(73) Assignee: Manga Mirrors of America, Inc., Holland, MI (US)

(*) Notice: Subject to any disclaimer, the term of this patent is extended or adjusted under 35 U.S.C. 154(b) by 0 days.

(21) Appl. No.: 13/595,522

(22) Filed: Aug. 27, 2012

(65) Prior Publication Data

US 2012/0320618 A1     Dec. 20, 2012

Related U.S. Application Data

(63) Continuation of application No. 13/234,870, filed on Sep. 16, 2011, now Pat. No. 8,251,555, which is a continuation of application No. 12/892,221, filed on Sep. 28, 2010, now Pat. No. 8,021,030, which is a continuation of application No. 12/484,712, filed on (Continued)

(51) Int. Cl.
*B60Q 1/26* (2006.01)
*B60R 1/12* (2006.01)

(52) U.S. Cl. ......... 362/494; 362/144; 362/540; 362/545

(58) Field of Classification Search .................. 362/494, 362/548, 549, 540, 545, 144; 340/472, 475
See application file for complete search history.

(56) References Cited

U.S. PATENT DOCUMENTS

| | | | |
|---|---|---|---|
| 1,096,452 A | 5/1914 | Perrin | |
| 1,278,741 A | 9/1918 | Phelps | |
| 1,353,253 A | 9/1920 | Livingston et al. | |
| 1,415,465 A | 5/1922 | High | |
| 1,458,703 A | 6/1923 | Harris et al. | |
| 1,563,258 A | 11/1925 | Cunningham | |
| 1,602,094 A | 10/1926 | Badding | |
| 2,010,138 A | 8/1935 | Condon | |
| 2,235,181 A | 3/1941 | Thiel | |
| 2,273,570 A | 2/1942 | Greenless | |
| 2,295,176 A | 9/1942 | Kelly | |

(Continued)

FOREIGN PATENT DOCUMENTS

| | | |
|---|---|---|
| DE | 2634372 | 2/1978 |
| DE | 3614882 | 11/1987 |

(Continued)

OTHER PUBLICATIONS

Re-examination Control No. 90/006,906, filed Jan. 14, 2004 for applicants Pastrick et al.

(Continued)

*Primary Examiner* — Thomas Sember
(74) *Attorney, Agent, or Firm* — Gardner, Linn, Burkhart & Flory, LLP

(57) ABSTRACT

A lighted exterior mirror assembly includes a housing that houses a reflectance element that is movably positionable by the driver of a vehicle to adjust its rearward field of view when the lighted exterior rearview mirror assembly is attached at a side of the vehicle. A ground illumination lamp is disposed at a portion of the lighted exterior mirror assembly and separate from the reflectance element. The ground illumination lamp is a substantially moisture-impervious unit having an enclosure and a lens that is permanently joined with the enclosure. The ground illumination lamp includes a light source disposed within the enclosure behind the lens and, when the lighted exterior mirror assembly is attached at the side of the vehicle and when the light source is electrically powered, the light source emits light that passes through the lens and illuminates a ground area adjacent the side of the vehicle.

93 Claims, 16 Drawing Sheets

Related U.S. Application Data

Jun. 15, 2009, now Pat. No. 7,815,348, which is a continuation of application No. 12/025,080, filed on Feb. 4, 2008, now Pat. No. 7,547,127, which is a continuation of application No. 10/905,121, filed on Dec. 16, 2004, now Pat. No. 7,325,953, which is a continuation of application No. 09/967,236, filed on Sep. 28, 2001, now Pat. No. 6,832,848, which is a continuation of application No. 09/596,015, filed on Jun. 16, 2000, now Pat. No. 6,296,379, which is a continuation of application No. 09/259,815, filed on Feb. 26, 1999, now Pat. No. 6,086,229, which is a continuation of application No. 08/933,375, filed on Sep. 19, 1997, now Pat. No. 5,879,074, which is a continuation of application No. 08/607,284, filed on Feb. 26, 1996, now Pat. No. 5,669,704, which is a continuation of application No. 08/426,591, filed on Apr. 21, 1995, now Pat. No. 5,497,306.

(56) References Cited

U.S. PATENT DOCUMENTS

| | | | |
|---|---|---|---|
| 2,457,348 A | 3/1946 | Chambers |
| 2,414,223 A | 1/1947 | De Virgilis |
| 2,511,971 A | 6/1950 | Dalton |
| 2,562,687 A | 7/1951 | Anderson |
| 3,522,584 A | 8/1970 | Talbot |
| 3,596,079 A | 7/1971 | Clark |
| 3,883,732 A | 5/1975 | Peterson |
| 4,041,301 A | 8/1977 | Pelchat |
| 4,136,925 A | 1/1979 | Menzies et al. |
| 4,143,368 A | 3/1979 | Route et al. |
| 4,205,325 A | 5/1980 | Haygood et al. |
| 4,223,983 A | 9/1980 | Bloom |
| 4,258,351 A | 3/1981 | Lipschutz |
| 4,274,078 A | 6/1981 | Isobe et al. |
| 4,281,899 A | 8/1981 | Oskam |
| 4,342,210 A | 8/1982 | Denningham |
| 4,446,380 A | 5/1984 | Moriya et al. |
| 4,475,100 A | 10/1984 | Duh |
| 4,569,002 A | 2/1986 | English et al. |
| 4,583,155 A | 4/1986 | Hart |
| 4,626,084 A | 12/1986 | Kumai |
| 4,646,207 A | 2/1987 | Levin |
| 4,661,800 A | 4/1987 | Yamazaki |
| 4,688,036 A | 8/1987 | Hirano et al. |
| 4,693,571 A | 9/1987 | Kimura et al. |
| 4,733,336 A | 3/1988 | Skogler et al. |
| 4,772,989 A | 9/1988 | Haraden |
| 4,807,096 A | 2/1989 | Skogler et al. |
| 4,808,968 A | 2/1989 | Caine |
| 4,809,137 A | 2/1989 | Yamada |
| 4,851,970 A | 7/1989 | Bronder |
| 4,866,417 A | 9/1989 | DeFino et al. |
| 4,868,722 A | 9/1989 | Haraden |
| 4,881,148 A | 11/1989 | Lambropoulos et al. |
| 4,890,907 A | 1/1990 | Vu et al. |
| 4,916,430 A | 4/1990 | Vu et al. |
| 5,014,167 A | 5/1991 | Roberts |
| 5,017,903 A | 5/1991 | Krippelz, Sr. |
| 5,038,255 A | 8/1991 | Nishihashi et al. |
| 5,049,867 A | 9/1991 | Stouffer |
| 5,059,015 A | 10/1991 | Tran |
| 5,109,214 A | 4/1992 | Heidman, Jr. |
| 5,113,182 A | 5/1992 | Suman et al. |
| 5,132,882 A | 7/1992 | Alder |
| 5,151,824 A | 9/1992 | O'Farrell |
| 5,166,240 A | 11/1992 | Sakazume et al. |
| 5,178,448 A | 1/1993 | Adams et al. |
| 5,179,471 A | 1/1993 | Caskey et al. |
| 5,206,562 A | 4/1993 | Matsuno et al. |
| 5,207,492 A | 5/1993 | Roberts |
| 5,223,814 A | 6/1993 | Suman |
| 5,287,101 A | 2/1994 | Serizawa |
| 5,303,130 A | 4/1994 | Wei et al. |
| 5,313,335 A | 5/1994 | Gray et al. |
| 5,357,169 A | 10/1994 | Toyozumi et al. |
| 5,371,659 A | 12/1994 | Pastrick et al. |
| 5,402,103 A | 3/1995 | Tashiro |
| 5,436,741 A | 7/1995 | Crandall |
| 5,448,397 A | 9/1995 | Tonar |
| 5,497,305 A | 3/1996 | Pastrick |
| 5,497,306 A | 3/1996 | Pastrick |
| 5,499,169 A | 3/1996 | Chen |
| 5,587,699 A | 12/1996 | Faloon et al. |
| 5,624,176 A | 4/1997 | O'Farrell et al. |
| 5,660,457 A | 8/1997 | Lyons |
| 5,669,699 A | 9/1997 | Pastrick et al. |
| 5,669,704 A | 9/1997 | Pastrick |
| 5,669,705 A | 9/1997 | Pastrick et al. |
| 5,788,357 A | 8/1998 | Muth |
| 5,823,654 A | 10/1998 | Pastrick et al. |
| 5,863,116 A | 1/1999 | Pastrick |
| 5,871,275 A | 2/1999 | O'Farrell et al. |
| 5,879,074 A | 3/1999 | Pastrick et al. |
| 5,886,838 A | 3/1999 | Kuramoto |
| 5,938,320 A | 8/1999 | Crandall |
| 6,045,243 A | 4/2000 | Muth |
| 6,074,077 A | 6/2000 | Pastrick et al. |
| 6,076,948 A | 6/2000 | Bukosky et al. |
| 6,086,229 A | 7/2000 | Pastrick |
| 6,099,153 A | 8/2000 | Zimmermann et al. |
| 6,099,155 A | 8/2000 | Pastrick |
| 6,139,171 A | 10/2000 | Waldmann |
| 6,139,176 A | 10/2000 | Hulse et al. |
| 6,149,287 A | 11/2000 | Pastrick et al. |
| 6,176,602 B1 | 1/2001 | Pastrick et al. |
| 6,206,553 B1 | 3/2001 | Boddy et al. |
| 6,250,783 B1 | 6/2001 | Stidham et al. |
| 6,276,821 B1 | 8/2001 | Pastrick |
| 6,280,068 B1 | 8/2001 | Martens et al. |
| 6,280,069 B1 | 8/2001 | Pastrick |
| 6,296,379 B1 | 10/2001 | Pastrick |
| 6,299,333 B1 | 10/2001 | Pastrick |
| 6,315,437 B1 | 11/2001 | Katz et al. |
| 6,367,957 B1 | 4/2002 | Hering et al. |
| 6,416,208 B2 | 7/2002 | Pastrick |
| 6,474,853 B2 | 11/2002 | Pastrick |
| 6,494,602 B2 | 12/2002 | Pastrick |
| 6,832,848 B2 | 12/2004 | Pastrick |
| 7,325,953 B2 | 2/2008 | Pastrick |
| 7,547,127 B2 | 6/2009 | Pastrick |
| 7,815,348 B2 | 10/2010 | Pastrick |
| 8,021,030 B2 | 9/2011 | Pastrick |
| 8,251,555 B2 | 8/2012 | Pastrick |

FOREIGN PATENT DOCUMENTS

| | | |
|---|---|---|
| DE | 3635471 | 4/1988 |
| DE | 3635473 | 4/1988 |
| DE | 3803510 | 9/1988 |
| DE | 9101029 | 4/1991 |
| DE | 4141208 | 6/1993 |
| DE | 9409566 | 8/1994 |
| DE | 19538771 | 4/1997 |
| DE | 29702746 | 4/1997 |
| DE | 19736482 | 2/1998 |
| EP | 0525541 | 11/1994 |
| EP | 0738627 | 10/1996 |
| EP | 0820900 | 1/1998 |
| FR | 1461419 | 2/1966 |
| FR | 2312136 | 9/1988 |
| FR | 2618397 | 1/1998 |
| GB | 1555541 | 11/1979 |
| GB | 2129749 | 5/1984 |
| GB | 2154969 | 9/1985 |
| GB | 2161440 | 1/1986 |
| GB | 2266870 | 11/1993 |
| GB | 2275329 | 8/1994 |
| GB | 2316379 | 2/1998 |
| JP | 58009855 | 1/1983 |
| JP | 58188733 | 11/1983 |
| JP | 59089746 | 6/1984 |
| JP | 60161646 | 10/1985 |

| | | |
|---|---|---|
| JP | 60183642 | 12/1985 |
| JP | 61188242 | 8/1986 |
| JP | 61218452 | 9/1986 |
| JP | 62121141 | 7/1987 |
| JP | 62191246 | 8/1987 |
| JP | 0218248 | 9/1987 |
| JP | 0239273 | 9/1989 |
| JP | 3050044 | 4/1991 |
| JP | 8142745 | 6/1996 |
| JP | 9095177 | 4/1997 |
| WO | WO8901425 | 2/1989 |

OTHER PUBLICATIONS

Re-examination Control No. 90/006,478, filed Dec. 5, 2002 for applicants Pastrick et al.
Re-examination Control No. 90/006,907, filed Jan. 14, 2004 for applicants Pastrick et al.

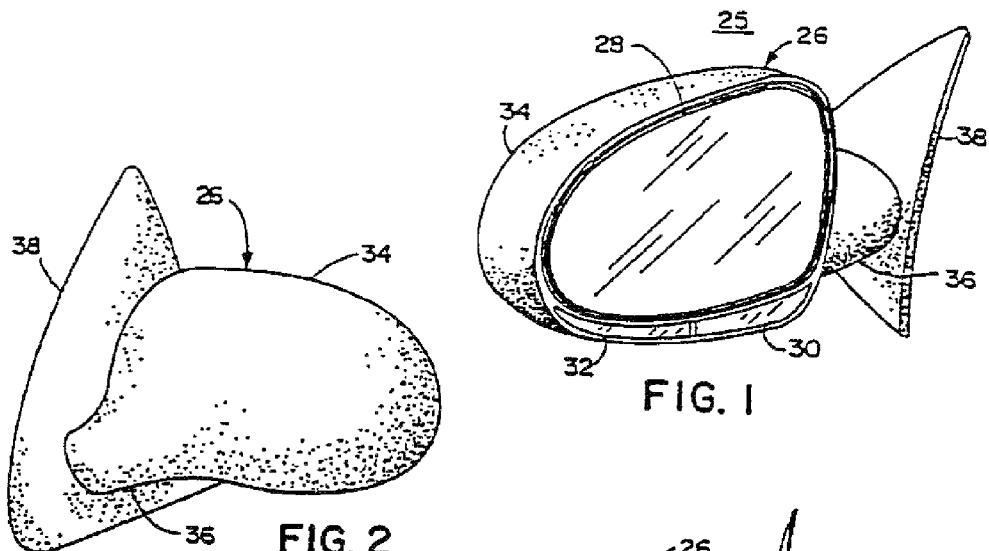
FIG. 1
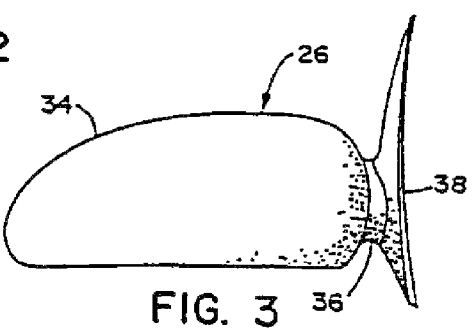
FIG. 3
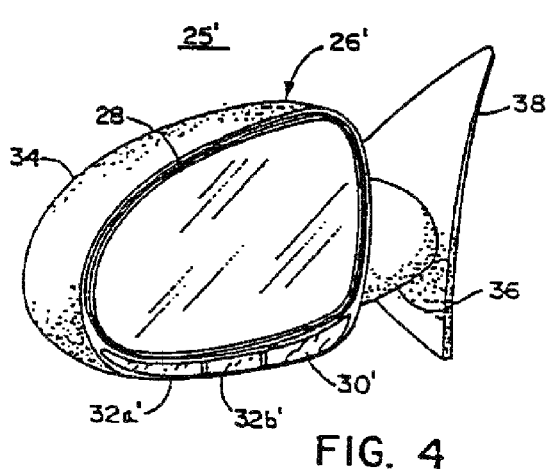
FIG. 2
FIG. 4

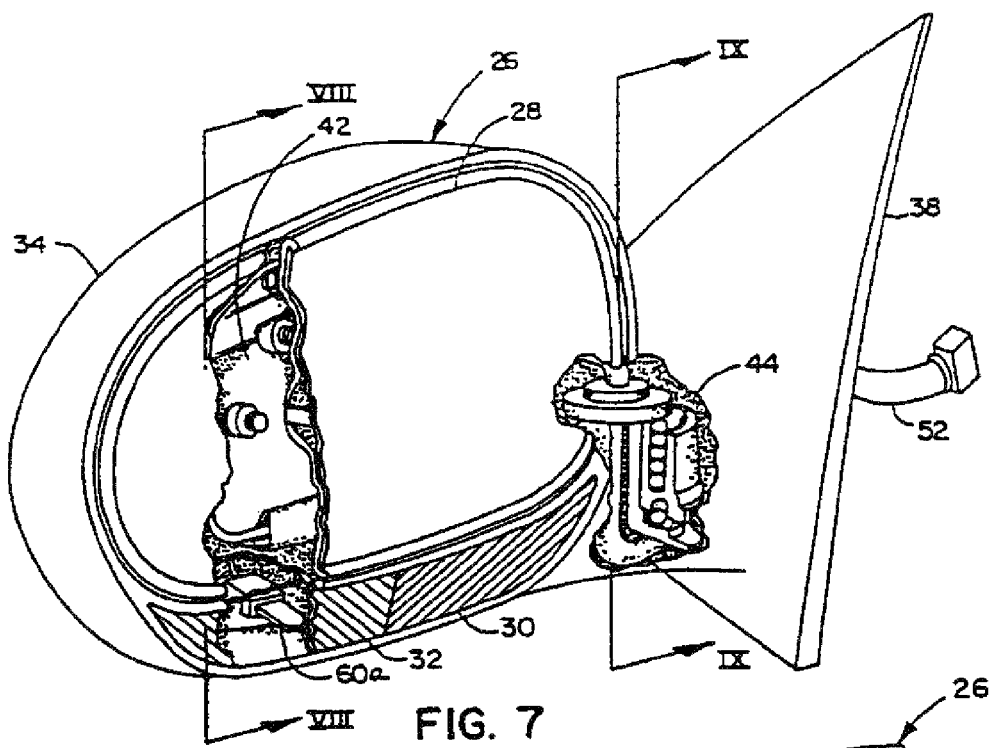
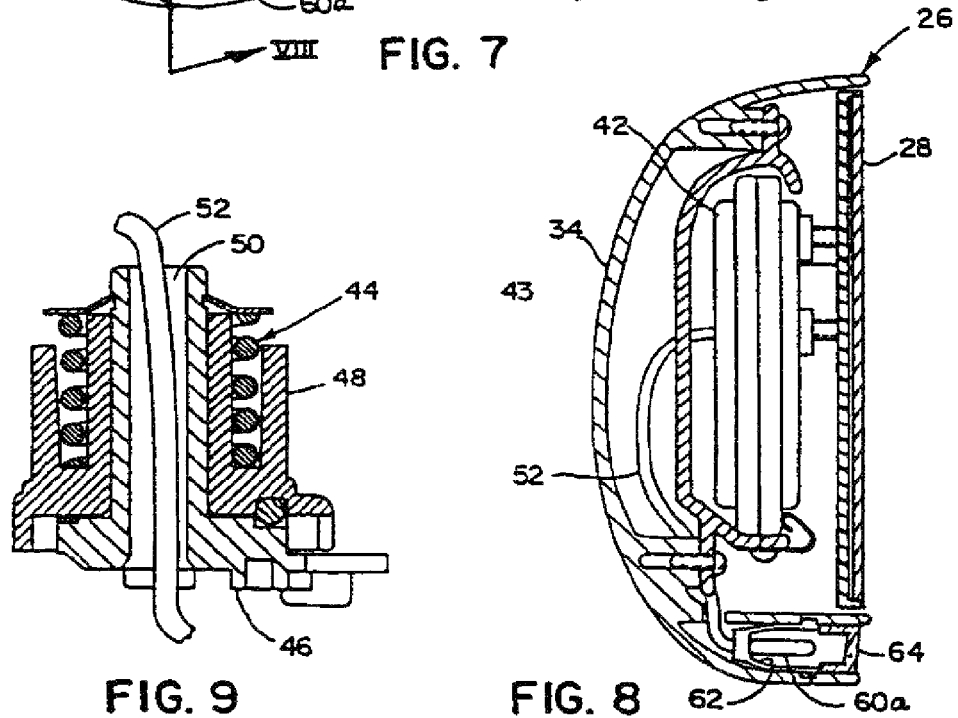
FIG. 7
FIG. 9
FIG. 8

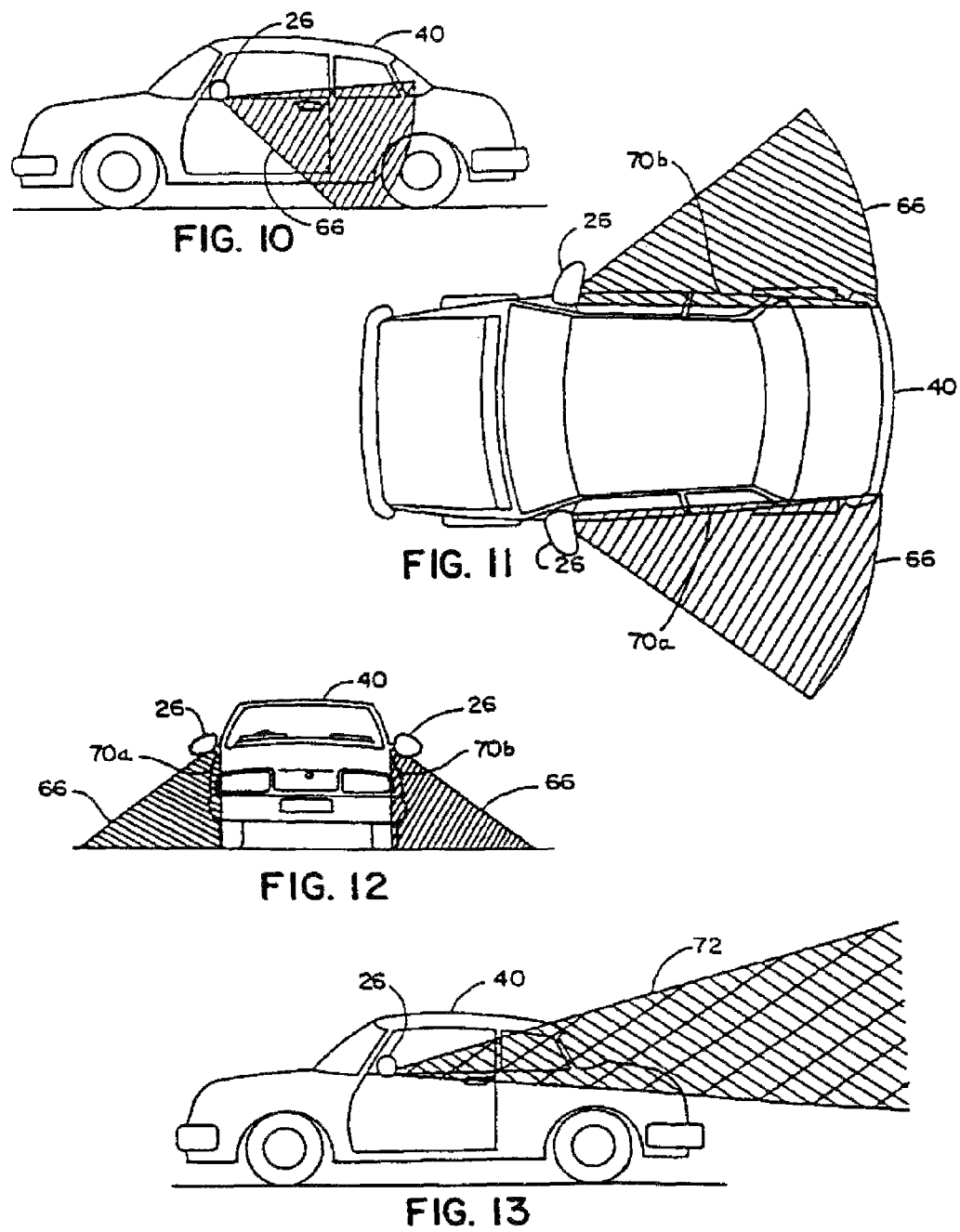

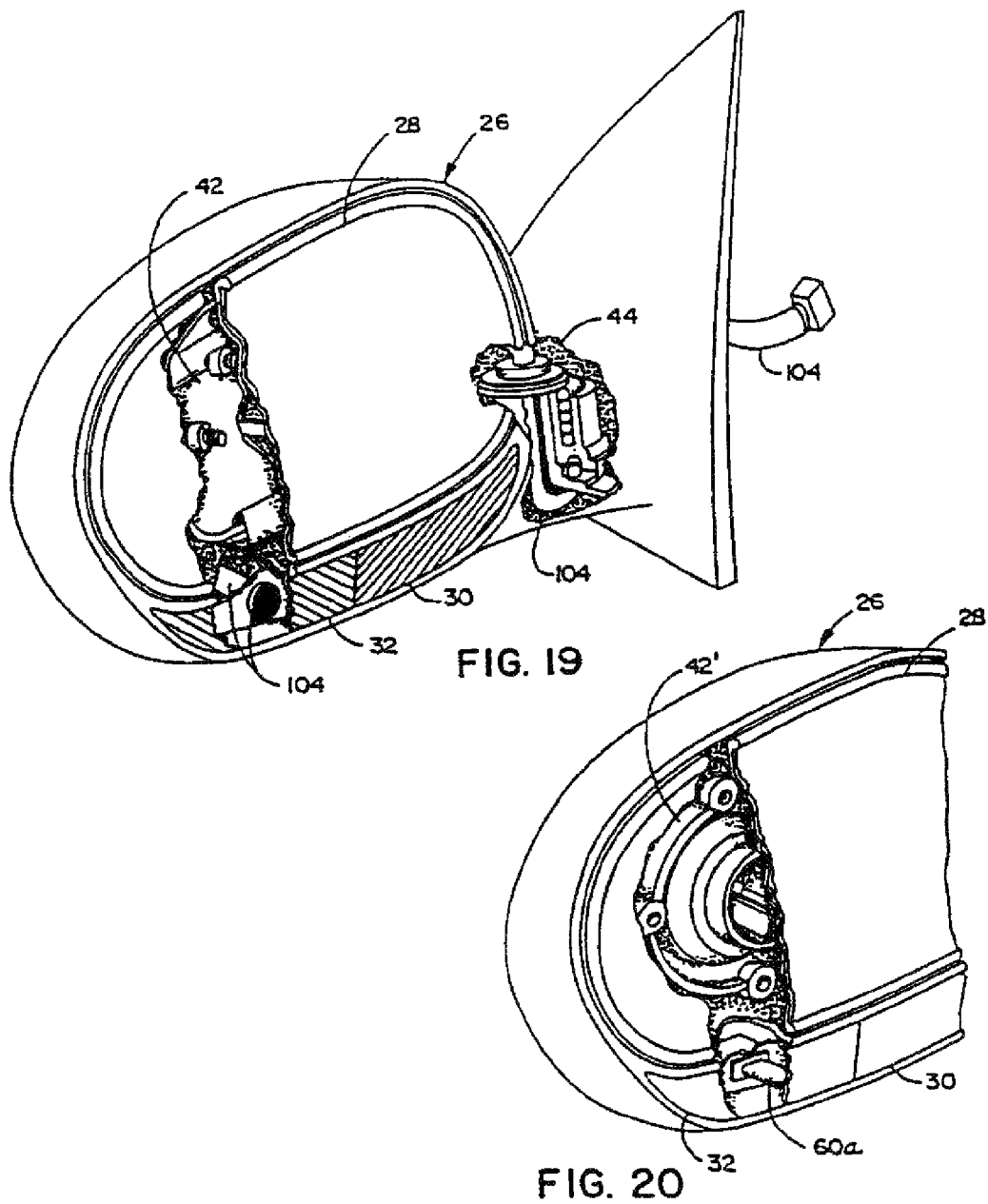

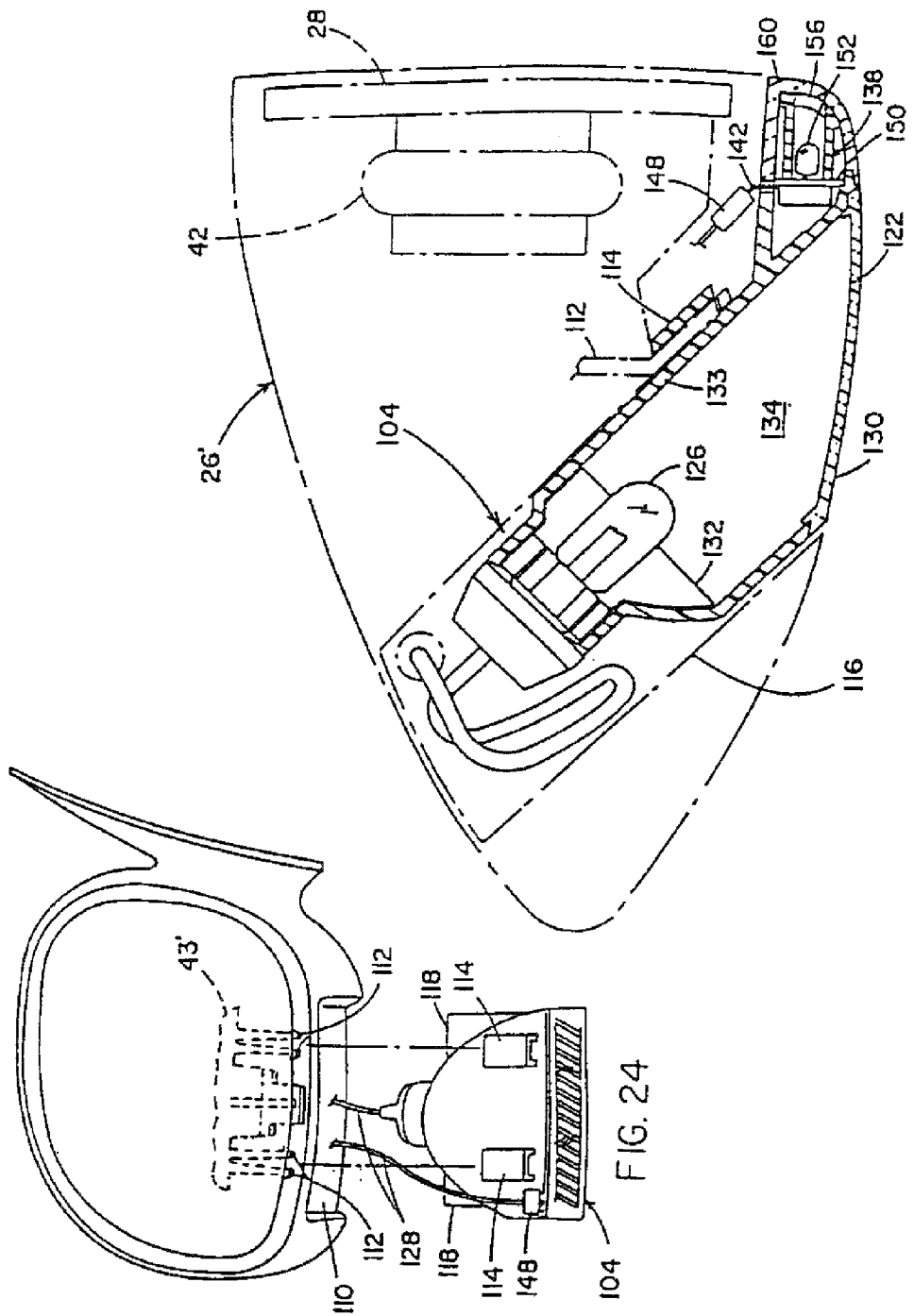

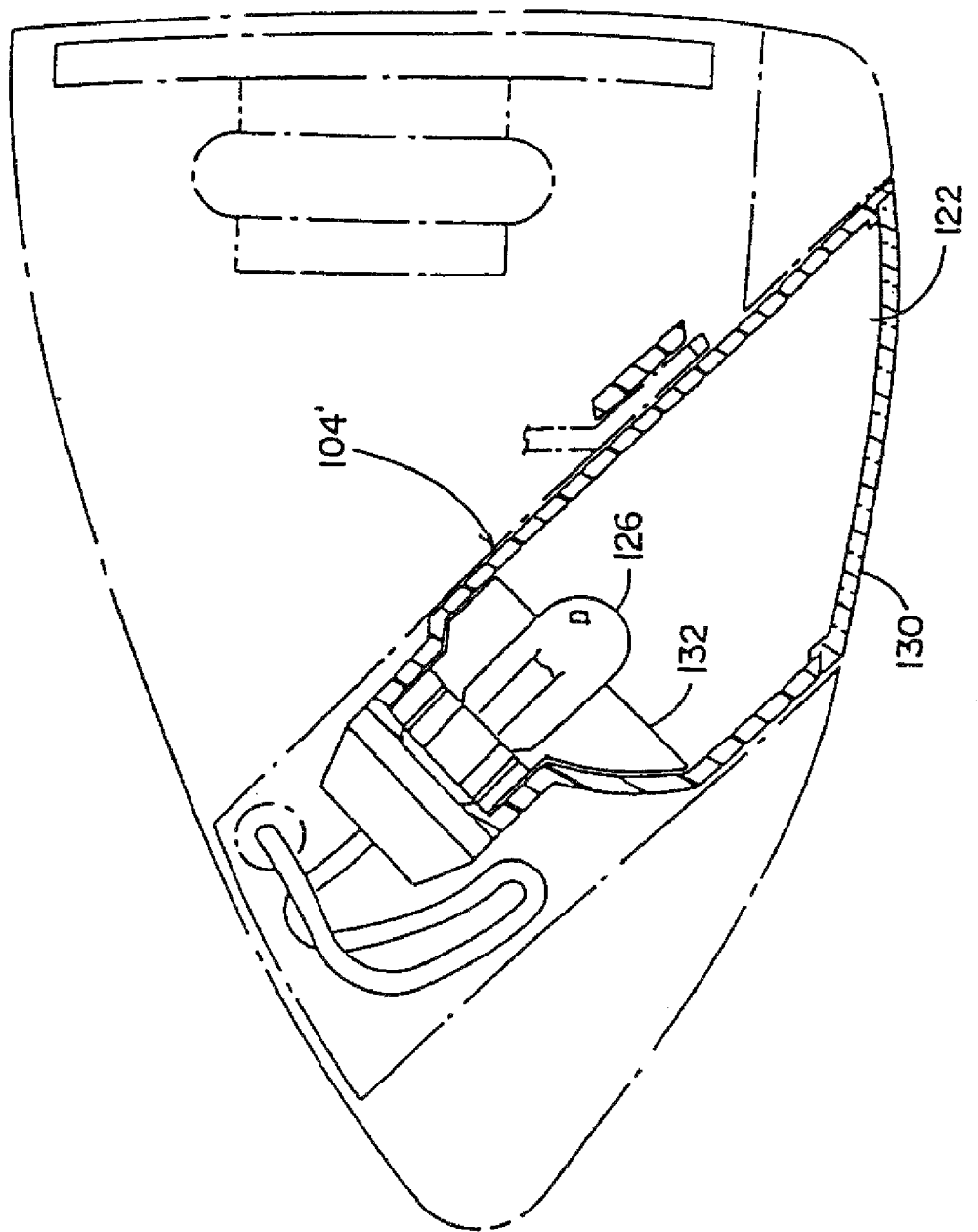

LIGHTED EXTERIOR MIRROR ASSEMBLY FOR VEHICLE

CROSS REFERENCE TO RELATED APPLICATIONS

This application is a continuation of U.S. patent application Ser. No. 13/234,870, filed Sep. 16, 2011, now U.S. Pat. No. 8,251,555, which is a continuation of U.S. patent application Ser. No. 12/892,221, filed Sep. 28, 2010, now U.S. Pat. No. 8,021,030, which is a continuation of U.S. patent application Ser. No. 12/484,712, filed Jun. 15, 2009, now U.S. Pat. No. 7,815,348, which is a continuation application of U.S. patent application Ser. No. 12/025,080, filed Feb. 4, 2008, now U.S. Pat. No. 7,547,127, which is a continuation application of U.S. patent application Ser. No. 10/905,121, filed Dec. 16, 2004, now U.S. Pat. No. 7,325,953, which is a continuation of U.S. patent application Ser. No. 09/967,236, filed Sep. 28, 2001, now U.S. Pat. No. 6,832,848, which is a continuation of U.S. patent application Ser. No. 09/596,015, filed Jun. 16, 2000, now U.S. Pat. No. 6,296,379, which is a continuation of U.S. patent application Ser. No. 09/259,815, filed Feb. 26, 1999, now U.S. Pat. No. 6,086,229, which is a continuation of U.S. patent application Ser. No. 08/933,375, filed Sep. 19, 1997, now U.S. Pat. No. 5,879,074, which is a continuation of U.S. patent application Ser. No. 08/607,284, filed Feb. 26, 1996, now U.S. Pat. No. 5,669,704, which is a continuation of U.S. patent application Ser. No. 08/426,591, filed Apr. 21, 1995, now U.S. Pat. No. 5,497,306.

BACKGROUND OF THE INVENTION

This invention relates generally to security systems for vehicles and, more particularly, to remotely actuated, personal safety lighting systems. The invention is particularly adapted to incorporation in the exterior mirrors of a vehicle.

Personal security in and around vehicles has become an important concern. In particular, an increasing number of assaults and robberies are committed in parking lots while occupants are entering and exiting vehicles. While remote-operated, keyless entry systems have been incorporated in vehicles in order to unlock the vehicle and illuminate interior lights, such systems merely expedite entry to the vehicle and do not, per se, enhance security around the vehicle. Accordingly, a need exists for a vehicle security system to increase the security for vehicle occupants while entering and exiting the vehicle. Any such system would need to be aesthetically pleasing and not burdensome in use.

In order to include a security light system in a vehicle exterior mirror assembly, the security light must be rugged and resistant to environmental conditions such as water splash from road surfaces, rain and other precipitation as well as car washes. The assembly desirably must additionally be of relatively low cost and easy to manufacture in order to be acceptable to vehicle manufacturers. In addition, the security light desirably must be capable of matching a multiplicity of mirror housing designs. Moreover, the security light desirably is compact so as to fit into the interior cavity of conventional exterior mirror housings. For styling and aerodynamic reasons, exterior mirror housings are of determined and restricted size, shape, design, and interior volume. Moreover, the interior volume is already typically relatively cramped as it must accommodate not only the mirror reflector element itself and its movement, but also usually a manual or electric actuator that allows adjustment of the rearward field of view of the reflector remotely by the driver from the interior cabin of the vehicle. Also, since it is commercially desirable for a manufacturer of a security light to supply to a multitude of exterior mirror manufacturers, for their incorporation into their own particular exterior mirror assembly construction, it is desirable that the light be of a module type that is compact; that is weatherproofed; that is attachable and receivable by a wide variety of exterior mirror assembly designs; that is readily, standardly, and conveniently connectable to the vehicle electrical service and wiring already commonly found in conventional exterior mirror assemblies; and that is economic both for manufacture by the light module manufacturer and for the manufacturer of the complete exterior mirror assembly who will incorporate the light module into a mirror housing.

Importantly, the security light must be easy to service. The vehicle repair technician must be provided with easy access to the light source in order to replace the light source during the useful life of the vehicle. Furthermore, the light source should be replaceable without removing and subsequently replacing numerous fasteners. Such fasteners are not only time-consuming to remove and replace, but are subject to getting lost as well as damaged. Most or all of the above requirements must be met in order to have a commercially viable vehicle exterior mirror assembly security system suitable for use on a vehicle, such as an automobile. Indeed, the Applicants do not know of any successful commercial incorporation of a light module into an exterior mirror assembly on an automobile and believe that their inventions are the first commercially successful applications of a light module suitable for use in the exterior mirror assembly on an automobile.

SUMMARY OF THE INVENTION

The present invention is intended to provide a personal safety feature for a vehicle in the form of a light adapted to projecting light generally downwardly on an area adjacent a portion of the vehicle in order to create a lighted security zone in the area. Advantageously, the light, that preferably provides a security function, is provided as a module that is suitable for use in the exterior mirror housing designs of various vehicles. The light module is capable of low cost, easy manufacture. Furthermore, the module is compact and is substantially moisture impervious in order to resist environmental forces. Advantageously, the light module is easy to service in order to replace the light source by requiring a minimum of, preferably one or no, fasteners in order to remove the module from the exterior mirror assembly. Furthermore, the invention encompasses a signal light module with the advantages described above and with the signal light generating a light pattern discernable to drivers of overtaking vehicles but largely imperceptible to the driver of the vehicle on which the signal light itself is mounted.

According to an aspect of the invention, a mirror assembly security system for a vehicle includes an exterior mirror assembly having a reflective element and a housing for the reflective element. A light module is removably positioned within the housing. The light module projects light from the housing on an area adjacent a portion of the vehicle, preferably in order to create a lighted security zone in that area. The light module includes an enclosure, a light-transmitting opening in the enclosure facing downwardly or rearwardly of the vehicle, or both, a cover for the light-transmitting opening, and a light source in the enclosure. The light module may further include a serviceable, removable light source receiving means, such as a socket positioned in another opening in the enclosure and a gasket for sealing the socket in the opening, or with the mating surface of the socket to the opening being self-gasketing. In this manner, the light source can be replaced by removing the light module from the exterior mirror housing and removing the socket from the light module. The light module and the mirror housing may have mating surface configurations, which at least partially retain the light module in the housing. This may eliminate the requirement for multiple fasteners which must be removed in order to service the light module.

The light module may further include a second light-transmitting opening in the enclosure facing rearwardly of the vehicle, a second cover for the second light-transmitting opening, and a second light source in the second enclosure radiating light through the second light-transmitting opening. This feature may provide a signal light for use as either a turn signal, a brake signal, or both, visible from the side of the equipped vehicle. In a preferred embodiment, the second light source is a plurality of light-emitting diodes and includes louvers between the light-emitting diodes. The louvers may be skewed in a direction away from the vehicle passenger compartment in order to shield the driver from light radiated by the light-emitting diodes.

The light module is preferably substantially moisture impervious in order to be resistant to environmental elements. The enclosure is preferably a unitary assembly with the lens covering the light-transmitting opening permanently joined with the remainder of the enclosure. The light source is preferably serviceably, movably received within the enclosure by a socket that engages in an opening in the enclosure. In this manner, the light source may be replaced by removing the light module from the exterior mirror housing, removing the socket from the enclosure and replacing the light source in the socket.

The invention provides a universal configuration for a mirror assembly security system, which allows the vehicle manufacturer to offer a mirror assembly system having only the security light feature, which projects light from the housing on an area adjacent a portion of the vehicle in order, for example, to create a lighted security zone in that area. Alternatively, the invention allows the vehicle manufacturer to offer a mirror assembly having an additional or a stand-alone signal light; for example, a turn signal, a brake light, or both a turn signal and a brake light. The signal light increases security for the vehicle occupant by providing signals to vehicles overtaking the equipped vehicle from the side. The signal light may be designed to be observed by other vehicles passing the equipped vehicle, but not directly by the driver of the equipped vehicle.

The security system is adapted to projecting a pattern of light from the exterior mirror housing on an area adjacent a portion of the vehicle that extends laterally onto the vehicle and downwardly and rearwardly of the vehicle. In this manner, a security zone is established in the vicinity of the vehicle doors where occupants enter and exit the vehicle. The signal light is adapted to projecting a pattern of light extending laterally away from the vehicle and rearwardly of the equipped vehicle. In this manner, the pattern generated by the signal light cannot be substantially observed by a driver of the equipped vehicle. However, the pattern generated by the signal light may be observed by a driver of another vehicle passing the vehicle equipped according to the invention.

By providing a lighted security zone adjacent the vehicle, users can observe suspicious activity around the vehicle. The pattern of light generated by a security light according to the invention establishes a security zone around, and even under, the vehicle in the important area where the users enter and exit the vehicle. The invention, further, conveniently combines a signal light that acts in unison with the vehicle's turn signal, brake light, or both, with the security light, or as a stand-alone accessory, in an exterior mirror assembly. The signal light may be designed to be observed by other vehicles passing the equipped vehicle but not directly by the driver of the equipped vehicle.

These and other objects, advantages and features of this invention will become apparent upon review of the following specification in conjunction with the drawings.

BRIEF DESCRIPTION OF THE DRAWING

FIG. 1 is a perspective view taken from the front of a mirror assembly (rear of the vehicle) incorporating the invention;

FIG. 2 is a rear view of the mirror assembly in FIG. 1;

FIG. 3 is a top view of the mirror assembly in FIG. 1;

FIG. 4 is the same view as FIG. 1 of an alternative embodiment of the invention;

FIG. 7 is a breakaway perspective view of the system in FIG. 1 revealing internal components thereof;

FIG. 8 is a sectional view taken along the lines VIII-VIII in FIG. 7;

FIG. 9 is a sectional view taken along the lines IX-IX in FIG. 7;

FIG. 10 is a side elevation of a vehicle illustrating the security zone light pattern generated by a security light according to the invention;

FIG. 11 is a top plan view of the vehicle and light pattern in FIG. 10;

FIG. 12 is a rear elevation of the vehicle and light pattern in FIG. 10;

FIG. 13 is a side elevation of a vehicle illustrating the light pattern generated by a signal light useful with the invention;

FIG. 19 is the same view as FIG. 7 of a fourth alternative light source;

FIG. 20 is the same view as FIG. 7 of the invention embodied in an alternative mirror structure;

FIG. 23 is a sectional view taken along the lines XXIII-XXIII in FIG. 22;

FIG. 24 is a front elevation of the mirror assembly in FIGS. 21 and 22 illustrating the manner in which a light module is removably mounted to an exterior rearview mirror housing;

FIG. 25 is the same view as FIG. 23 of an alternative embodiment;

DESCRIPTION OF THE PREFERRED EMBODIMENTS

Figure 5:
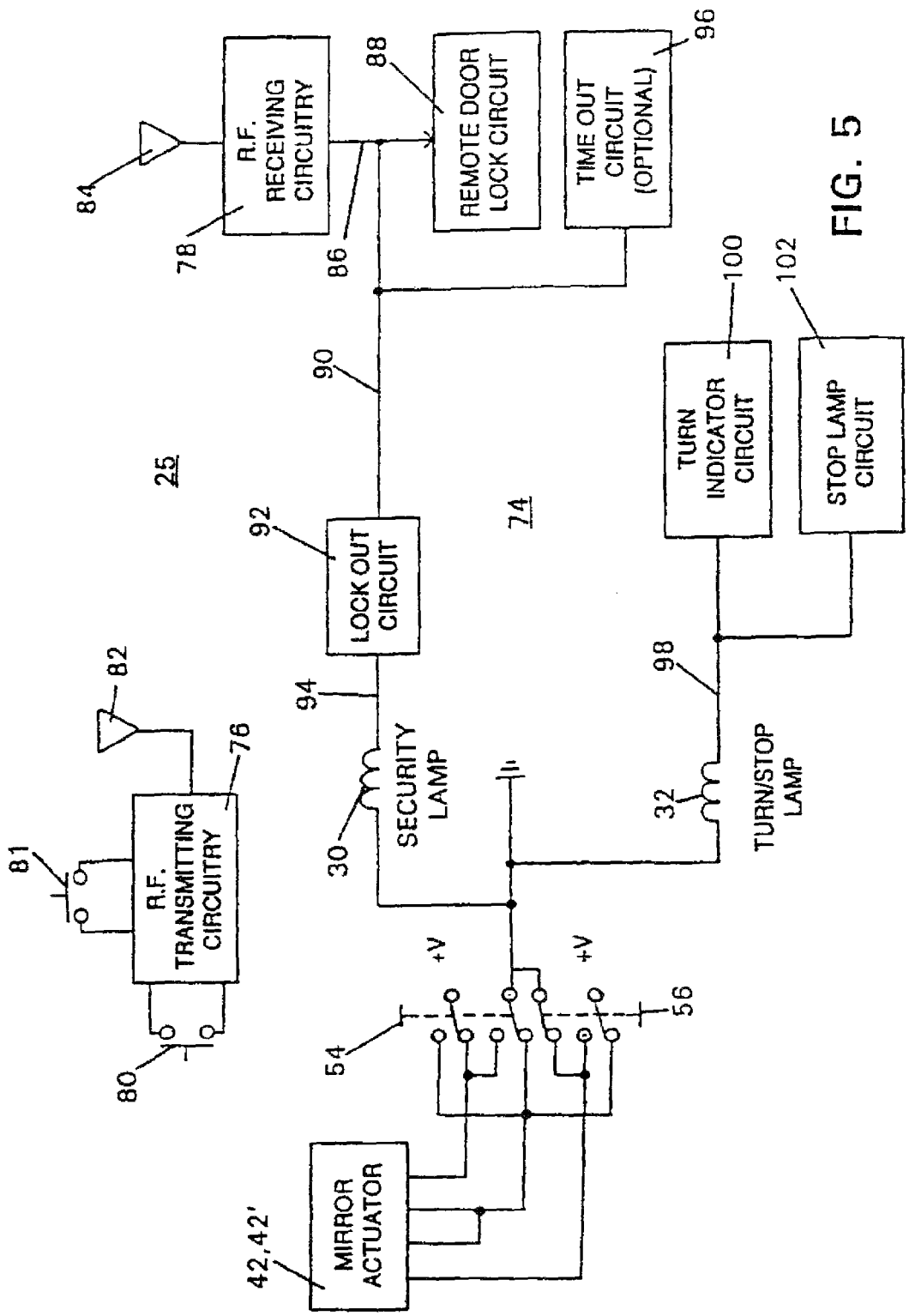
FIG. 5 is a block diagram of a control system according to the invention.

Referring now specifically to the drawings, and the illustrative embodiments depicted therein, a vehicle personal security lighting system 25 includes an exterior mirror assembly 26 having a conventional reflectance element 28, a security light 30, preferably white, or clear, and a signal light 32, preferably red or red-orange, incorporated in a housing, or casing, 34. Casing 34 is connected by a neck 36 to a stationary panel or sail 38 adapted for incorporation with the forward portion of the vehicle side window assembly, and which mounts mirror assembly 26 to the door of a vehicle 40 (see FIG. 10). Reflectance element 28 may be any of several reflectors, such as glass coated on its first or second surface with a suitable reflective layer or layers, such as those disclosed in U.S. Pat. No. 5,179,471, the disclosure of which is hereby incorporated by reference herein, or an electro-optic cell including a liquid crystal, electrochromic, or electrochemichromic fluid, gel or solid-state compound for varying the reflectivity of the mirror in response to electrical voltage applied thereacross as disclosed in U.S. Pat. No. 5,151,824, the disclosure of which is hereby incorporated by reference herein.

With reference to FIGS. 7 and 8, as is conventional, reflectance element 28 is mounted to a bracket 43 by a positioning device such as an actuator 42. Casing 34 is mounted to bracket 43. Actuator 42 provides remote positioning of reflectance element 28 on two orthogonal axes. Such actuators are well known in the art and may include a jackscrew-type actuator 42 such as Model No. H16-49-8001 (right-hand mirror) and Model No. H16-49-8051 (left-hand mirror) by Matsuyama of Kawagoe City, Japan, as illustrated in FIG. 7, or a planetary-gear actuator 42' such as Model No. 540 (U.S. Pat. No. 4,281,899) sold by Industrie Koot BV (IKU) of Montfoort, Netherlands, as illustrated in FIG. 20. As is also conventional, the entire casing 34 including actuator 42, 42' is mounted via bracket 43 for breakaway motion with respect to stationary panel 38 by a breakaway joint assembly 44. Breakaway joint assembly 44 (FIG. 9) includes a stationary member 46 attached to vehicle 40, a pivoting member 48 to which bracket 43 and casing 34 are attached, and a wire-way 50 through which a wire cable 52 passes. Wire cable 52 includes individual wires to supply control signals to actuator 42, 42', as well as signals to control the level of reflectivity, if reflective element 28 is of the variable reflectivity type noted above, such as an electrochromic mirror. Power may also be supplied through cable 52 for a heater 53 as disclosed in U.S. Pat. No. 5,151,824 in order to evaporate ice and dew from reflective element 28.

With reference to FIG. 5, actuator 42, 42' receives a first set of reversible voltage signals from a switch 54, in order to bidirectionally pivot in one axis, and a second set of reversible signals from a switch 56, in order to bidirectionally pivot in the opposite axis, as is conventional. Switches 54 and 56 are actuated by a common actuator (not shown) that is linked so that only one of the switches 54 and 56 may be actuated at a time. In this manner, actuator 42, 42' may utilize one common conductor for both switches 54, 56.

Each of the security light 30 and signal light 32 includes a light source 60 and reflector 62 behind a lens 64 (FIG. 8). Light source 60, reflector 62 and lens 64 are designed for security light 30 to project a pattern 66 of light, such as white light, through a clear, non-filtering lens, in order to establish a security zone around the vehicle (FIGS. 10-12). Pattern 66 extends rearward from mirror assembly 26. Vertically, pattern 66 contacts the ground at 68 in the vicinity of entry and exit by the vehicle occupants (FIGS. 10 and 12). Laterally, pattern 66 fans out into contact with the side 70a, 70b of the vehicle. This contact washes the sides of the vehicle to reflect the light in order to further illuminate the area in order to establish the security lighting zone (FIGS. 11 and 12). In a preferred embodiment, pattern 66 extends rearwardly from mirror assembly 26 without projecting any portion of the pattern forwardly of the mirror assembly.

Figure 14:
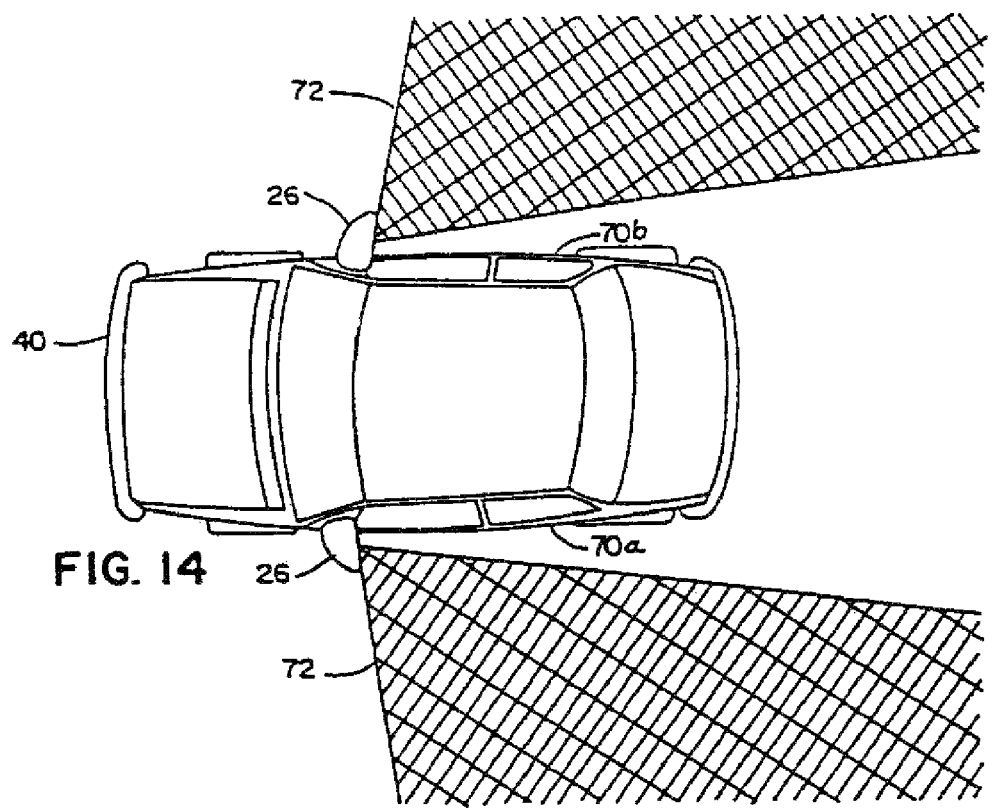
FIG. 14 is a top plan view of the vehicle and light pattern in FIG. 13.
Figure 15:
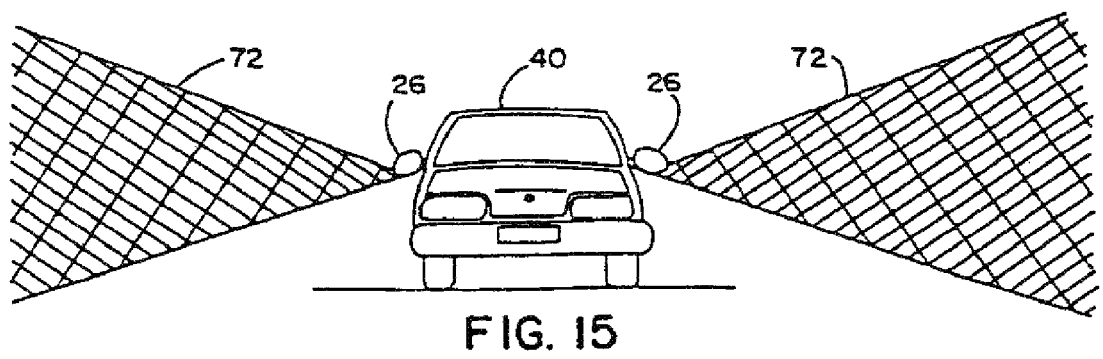
FIG. 15 is a rear elevation of the vehicle and light pattern in FIG. 13.

Signal light 32 generates a light pattern 72, which is directed generally horizontally rearwardly of vehicle 40 (FIGS. 13-15). Pattern 72 is laterally directed substantially away from side 70a, 70b of vehicle 40 so that the driver of vehicle 40 does not directly intercept pattern 72, although a mirror intensity (such as 10%) of the pattern is intercepted by the driver in order to provide awareness of the actuating of the signal light. Pattern 72 fans laterally away from side 70a, 70b to an extent that is parallel the face of reflectance element 28, which is substantially perpendicular to side 70a, 70b (FIG. 14). Thus, the driver of another vehicle (not shown) passing vehicle 40 on the left or right side of vehicle 40 will intercept pattern 72 while the vehicle is behind and beside vehicle 40. Although, in the illustrated embodiment, lens 64 of signal light 32 is substantially planar, lens 64 of signal light 32 could be made to wrap around the outward side of casing 34 in order to function as a side marker for the vehicle as is required in some European countries.

Vehicle mirror assembly security system 25 is actuated by a control system 74 (FIG. 5). Control system 74 includes means for actuating security light 30 including a remote transmitting device 76 and a stationary receiving device 78. Transmitting device 76 may be remotely carried by the vehicle operator and includes switches 80 and 81 in order to actuate the transmitting circuitry to transmit a signal from antenna 82, which is received by antenna 84 of receiving device 78. Receiving device 78 is mounted in the vehicle, such as in the vehicle trunk compartment, interior cabin, or within or on a mirror assembly, and includes an output 86 in order to operate remote door lock circuit 88, as is conventional. For example, an antenna, such as a metallic antenna comprising, for example, 6 to 20 gauge copper wire, and/or an RF, IR, and the like signal receiving circuit, may be incorporated into one, and preferably both, of the exterior mirror assemblies, or into the interior mirror assembly, or into vehicle glazing, trim items such as sunvisors and overhead consoles, and their like. Such an antenna can be auxiliary mounted, integrally mounted, or insert molded into or onto, for example, the exterior mirror bracket, sail, housing, bezel, or visor, or could be part of the light module. Such receiving system can be of the automatic, proximity detection type that automatically senses proximity and approach of the vehicle owner by its automatic detection of the transducer carried by the vehicle owner, without that vehicle owner having necessarily to operate neither a button on a hand-held unit. Also, the receiver may be part of, or itself be, a proximity detection system that activates and illuminates the light module of this invention whenever the vehicle is approached under conditions where vehicle security is being detected and protected.

Output 86 is, additionally, provided as an input 90 of a lockout circuit 92, whose output 94 is supplied to security lamp 30. Input 90 may additionally be actuated by a timeout circuit 96, which is conventionally supplied in a vehicle in order to dim the interior lights, following a slight delay, after the occurrence of an event, such as the opening and closing of the doors of the vehicle. Signal light 32 is actuated on line 98 from either a turn indicator circuit 100 or a stop lamp indicator circuit 102, both of which are conventionally supplied with vehicle 40.

In operation, when the operator actuates switch 80 of transmitting device 76, receiving device 78 produces a signal on output 86 in order to cause remote door lock circuit 88 to unlock the doors. Alternatively, actuation of switch 81 on remote transmitting device 76 causes receiving device 78 to produce a signal on output 86 to cause remote door lock circuit 88 to lock the vehicle doors. The signal on output 86 actuates security lamp 30 provided that lockout circuit 92 does not inhibit the signal. Lockout circuit 92 responds to operation of the vehicle in order to avoid actuation of security lamp 30 when the vehicle is in motion. Such lockout circuits are conventional and may be responsive to placing of the vehicle transmission in gear or sensing of the speed of the vehicle, or the like. The lockout circuit may also be included in the vehicle's ignition system, such that the security light is disabled when the engine is started and the vehicle is operating. Thus, the lamp will be off when the ignition switch is turned to start the engine. Security lamp 30 is also actuated, in response to interior lighting device timeout circuit 96, whenever the interior lights of the vehicle are being actuated by timeout circuit 96, provided that lockout circuit 92 does not inhibit the signal from security lamp 30. This is provided in order to allow security lamp 30 to be actuated in response to the entry to, or exit from, vehicle 40 without the operator utilizing transmitting device 76 to lock or unlock the doors. Signal lamp 32 is actuated in response to turn indicator circuit 100 whenever the operator moves the indicator stick in the direction of that particular signal lamp 32. Signal lamp 32 may additionally be actuated from stop lamp circuit 102 in response to the driver actuating the vehicle's brakes.

In the embodiment illustrated in FIGS. 1 and 5, lens 64 of signal lamp 32 is adapted to filter the light provided from lamp 32 so as to be red and is provided for vehicles 40 in which the stop lamps and rear turn indicator lamps are, likewise, red. Because signal lamp 32 shines red, pattern 72 is restricted from extending forward of the vehicle. This is in order to comply with regulations prohibiting red lights from causing confusion with emergency vehicles by shining forward of the vehicle.

Figure 6:
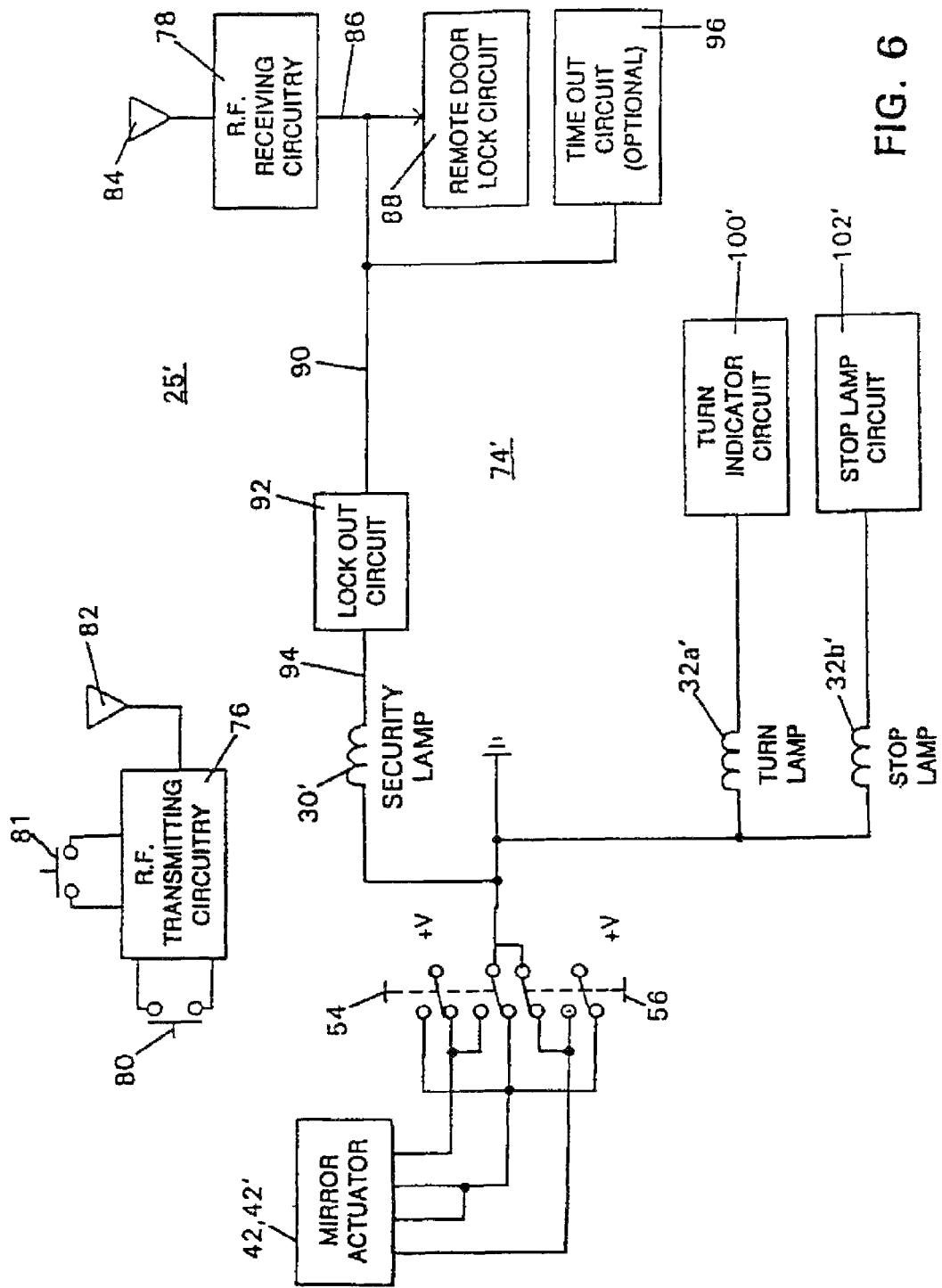
FIG. 6 is a block diagram of an alternative embodiment of a control system according to the invention.

For vehicles having red stoplights and amber turn indicators in the rear, a vehicle mirror security assembly 25' includes an exterior mirror assembly 26' and a control system 74' (FIGS. 4 and 6). Exterior mirror assembly 26' includes a security light 30', preferably white or clear, and a pair of signal lights 32a' and 32b'. Signal light 32a' is amber and is actuated directly from turn indicator circuit 100'. This amber color can be provided either by an amber light bulb or source, or a filtering lens providing an amber color. Signal light 32b' is red, red-orange or amber, as desired by the automaker, and is actuated directly from stop lamp circuit 102'. Each of the light patterns generated by signal lights 32a' and 32b' substantially correspond with light pattern 72. The light pattern generated by security light 30' is substantially equivalent to pattern 66. With the exception that turn signal indicator circuit 100' actuates signal light 32a' and stop lamp circuit 102' actuates signal light 32b', control system 74' operates substantially identically with control circuit 74.

Figure 16:
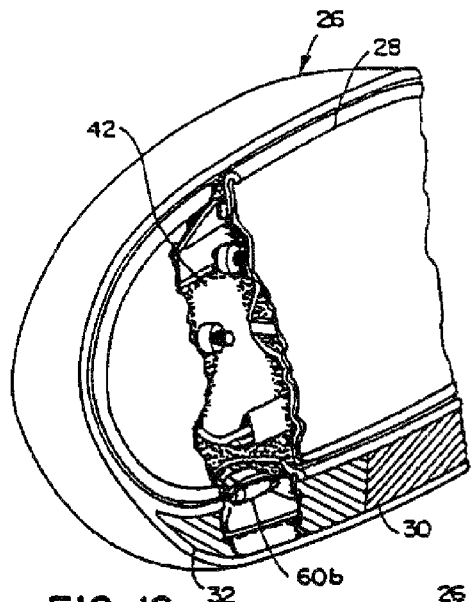
FIG. 16 is the same view as FIG. 7 of a first alternative light source according to the invention.
Figure 17:
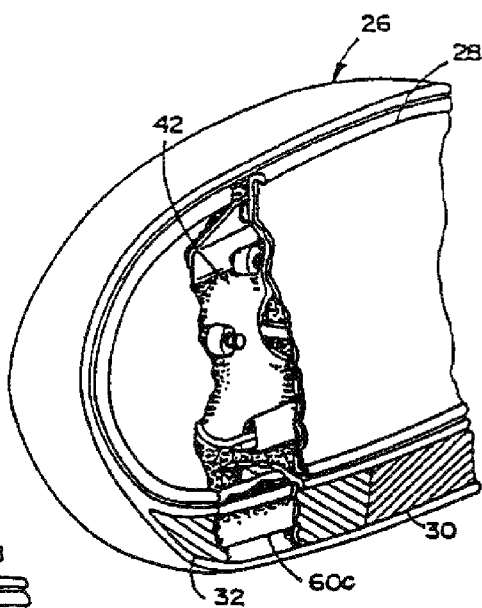
FIG. 17 is the same view as FIG. 7 of a second alternative light source.
Figure 18:
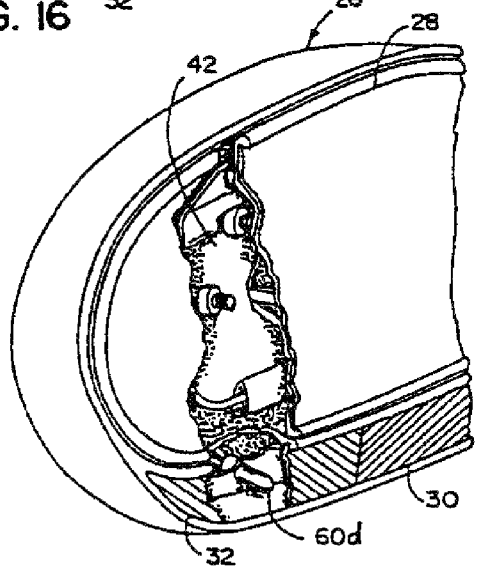
FIG. 18 is the same view as FIG. 7 of a third alternative light source.

In the illustrated embodiment, light source 60, for both security light 30 and signal light 32, may be supplied as a conventional incandescent or halogen lamp 60a (FIG. 7). Alternatively, a conventional incandescent fuse lamp 60b may be used (FIG. 16). Alternatively, a vacuum fluorescent lamp 60c, which is available in various colors, may be used (FIG. 17). Alternatively, a light-emitting diode 60d may be used (FIG. 18). As yet a further alternative, a fiber optic bundle 104 forming a light pipe may be positioned to discharge light behind lens 64. Fiber optic bundle 104 passes through breakaway joint 44 in wire-way 50 in order to transmit light from a source (not shown) within vehicle 40. By way of example, lens 64 may be supplied as a clear lens, a diffuser lens, a segmented lens, a prismatic lens, or a Fresnel lens in order to generate light patterns 66 and 72. Bracket 43 and breakaway joint 44 are marketed by Donnelly Corporation, the present assignee, of Holland, Mich. The remote actuator composed of remote transmitting device 76 and stationary receiving device 78 may be radio frequency coupled, as is conventional. Alternatively, they may be infrared coupled as illustrated in U.S. Pat. No. 4,258,352.

Although the invention is illustrated in a mirror assembly utilizing an automatic remote actuator, it may also be applied to manual remote actuators and handset actuators. As previously set forth, reflectance element 28 may be conventional or may be supplied as an electrochromic self-dimming mirror. Although the invention is illustrated with breakaway joint 44, the invention may also be applied to mirrors that are rigidly mounted to the vehicle.

Figure 21:
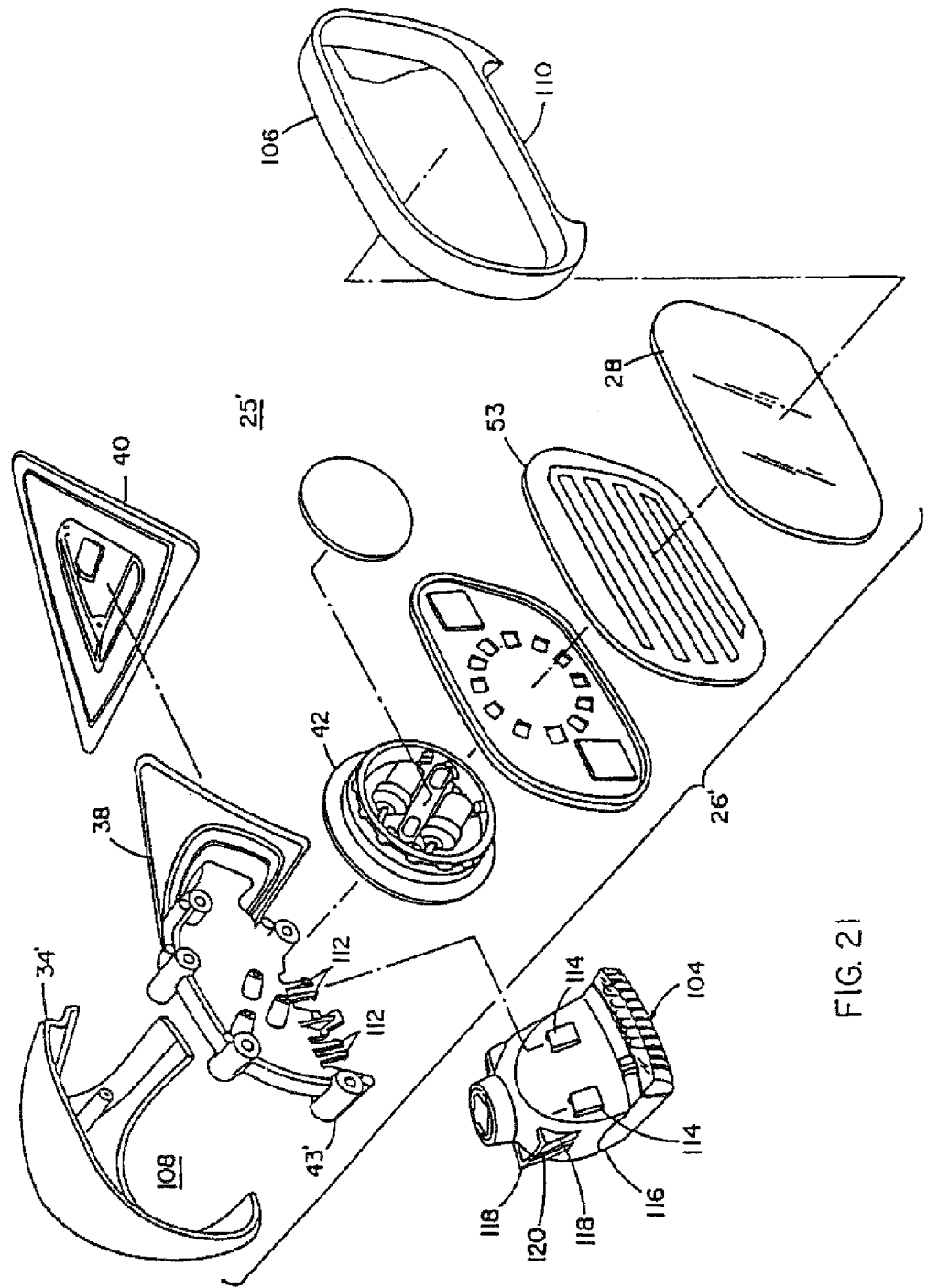
FIG. 21 is an exploded perspective view taken from the front of a mirror assembly (rear of the vehicle), according to another aspect of the invention.
Figure 22:
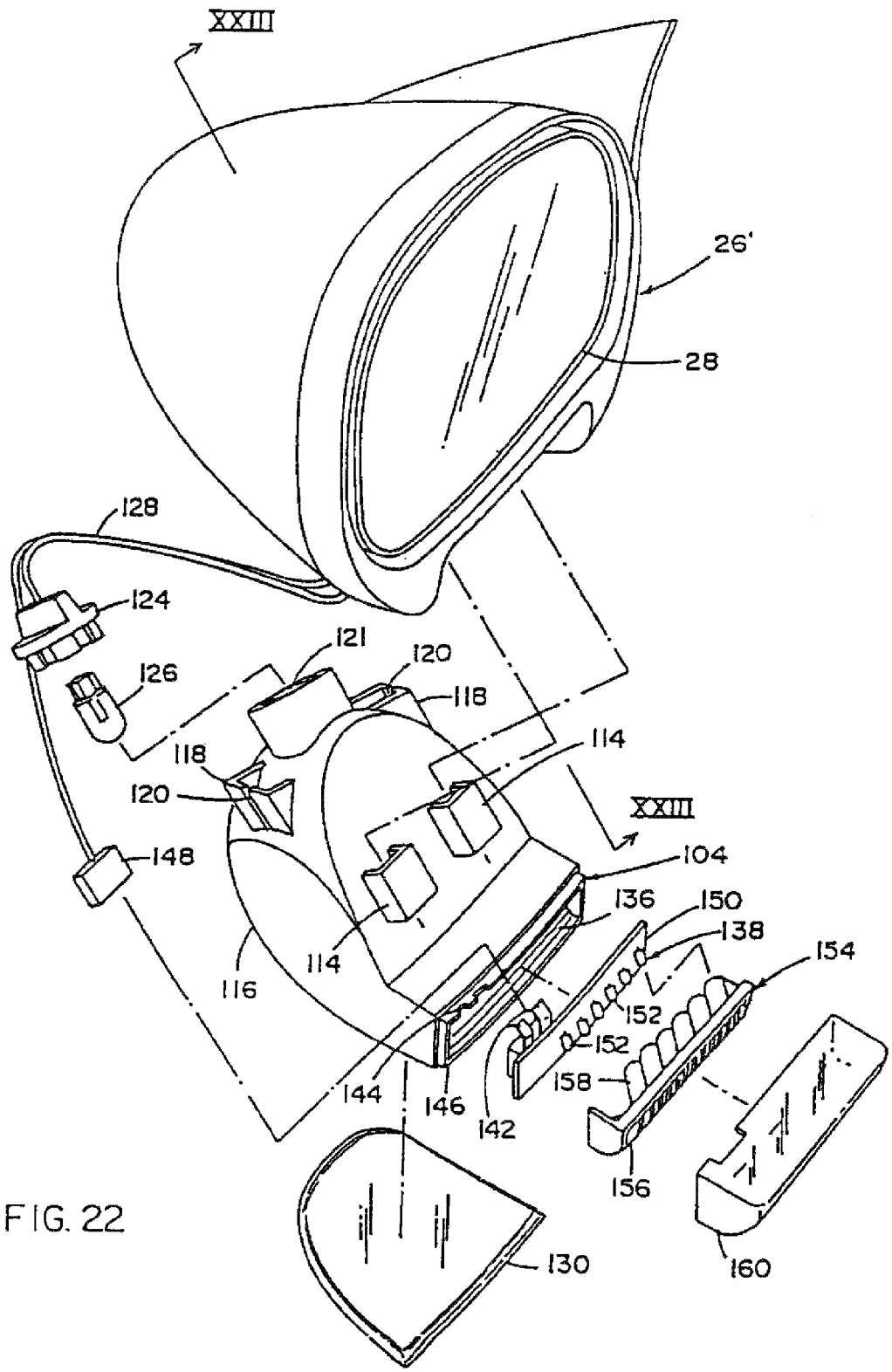
FIG. 22 is an exploded perspective view illustrating details of the light module.

An alternative vehicle personal security lighting system 25' includes a light module 104 that is removably positioned within housing 34' of exterior mirror assembly 26' (FIG. 21). In addition to the opening for accepting bezel or cowling 106, mirror housing 34' includes a downward opening 108 for receiving light module 104. Additionally, bezel 106 includes a recess 110 which defines an opening facing generally downwardly and rearwardly of the vehicle. Exterior mirror assembly 26 includes a bracket 43' for mounting positioning device 42 which mounts reflective element 28. Bracket 43' has two pairs of flexible prongs 112, which are received within sockets 114 defined on an enclosure 116 of light module 104. Prongs 112 releasably engage sockets 114 in order to retain the light module within the exterior mirror assembly in openings 108 and 110. Light module 104 may be disassembled from exterior mirror assembly 26' by reaching behind reflective element 28 with a pair of needle-nose pliers, or the like, and sequentially compressing each of the pairs of prongs 112 in order to release the prongs from sockets 114. Thus, prongs 112 and sockets 114 provide a fastener-less system which retains the light module in the exterior mirror assembly without the use of separate fasteners. A pair of shoulders 118, which define a slot 120 therebetween, engage a protrusion from an inner surface (not shown) of housing 34' in order to assist in stably positioning light module 104 within housing 34'. Alternatively, one or more fasteners, such as screws, clasps, latches, clips, and their like could be used. But, preferably, for ease of serviceability and for consumer acceptability, only one, and at most two, such fastener should be used. A further advantage of a fastener-less system is that it facilitates supply of a light module of this invention for use in a plurality of exterior mirror assemblies manufactured by a multitude of exterior mirror manufacturers with minimum modifications to the complete mirror assembly housing.

Unitary enclosure 116 has a generally downwardly directed light-transmitting opening 122 and an opening 121 for receiving a light socket 124. Light socket 124 provides electrical connection to a light source 126, which is electrically interconnected to the vehicle through a cable 128. The socket may be self-gasketing, achieved by selection of a material in its construction, at least at the mating surface, that achieves a sealing function. Preferably, the socket, either wholly, or partially at least at its mating surface, is a resilient, somewhat flexible polymer material, preferably with a durometer hardness, measured on the SHORE A scale of less than approximately 95, more preferably less than approximately 85, and most preferably less than approximately 75 but preferably of SHORE A hardness greater than about 50, and preferably greater than about 60. Materials appropriate to achieve this, and simultaneously have the physical, mechanical, and high temperature performance needed, include silicone, urethanes, thermoplastic rubbers, and polyvinyl chloride. Preferably, the material used for the self-gasketing socket is capable of withstanding temperatures in use in excess of approximately $200^N$ F or higher. Alternatively, a rigid construction may be used for the light socket, such as a ceramic, engineering plastic, Bakelite, nylon, polyester, filled polyester, or filled (glass and/or mineral) nylon, if a gasketing material delivering the above properties are used at the point of mating of light socket 124 and enclosure 116. Light socket 124 seals against enclosure 116 by the provision of a gasket, which, in the illustrated embodiment, is provided by the flexible nature of light socket 124. Alternatively, a separate gasket member formed of material such as silicone, neoprene, thermoplastic rubber, EPDM, polypropylene/EPDM alloy and similar elastomeric materials, preferably having the hardness properties listed above, could be inserted between the light socket and the enclosure. Light-transmitting opening 122 is covered by a cover member 130. Cover member 130 is a lens member, which affects the distribution of light emitted from light source 126. In the illustrated embodiment, cover member 130 is a clear optic lens that provides a substantially uniform puddle of light on the illuminated area adjacent the vehicle's door having a relatively wide light pattern, or flood pattern. Alternatively, cover member 130 could be a diffractive optic, a diffusive optic, a refractive optic, a reflective optic, a holographic optic, a binary optic, or a sinusoidal optic. In the illustrated embodiment, light source 126 is an incandescent lamp that is a filament optic having a minimum five-candle power. Such candle power mounted within an exterior mirror assembly of an automobile will preferably produce a ground surface illumination intensity of at least approximately 5 lux or greater, more preferably at least about 10 lux, and most preferably at least about 20 lux. Light source 126 may range in power up to 32-candle power or more. The preferred range is between approximately 5-candle power and approximately 15-candle power. It is desirable to provide as much candle power as possible without creating excessive heat within enclosure 116. If a high wattage lamp is used, a ventilation system is provided. Ventilation techniques are known in the art which allow the passage of air through the cavity 134 in which the light source is positioned while providing a substantially moisture-impervious barrier.

Light module 104 additionally includes a reflector 132 surrounding light source 126, both positioned in a cavity 134, which extends to light-transmitting opening 122. The purpose of the reflector is in order to direct the light from light source 126 into the pattern of light illustrated in FIGS. 10-12. Reflector 132 may be a parabolic reflector, as illustrated in FIG. 23, but may additionally include an extended tunnel in order to provide collimation of the light beam. In the illustrated embodiment, reflector 132 is aluminum or high efficiency aluminum vacuum-deposited on a wall 133 defining cavity 134, with an optional coating of lacquer. Alternatively, wall 133 may be coated with a white paint, such as "Argent" white or a silver paint. Reflector 132 may be a separate member, such as stamped metal or an aluminized glass optic. Alternatively, light source 126 and reflector 132 may be provided as an assembly.

Light module 104 includes a second cavity 140 defined in enclosure 116 and extending to a second light-transmitting opening 136. A signal light assembly 138 is positioned within cavity 140 to radiate light rearwardly with respect to the vehicle. Signal light assembly 138 includes a pair of electrical contacts 142, which protrude through grooves 144 defined in a flange 146 surrounding opening 136. Contacts 142 engage a connector 148, which provides electrical connection between signal light assembly 138 and the vehicle through cable 128 which, in turn, may piggyback or otherwise connect to existing 12-volt battery/ignition wiring already supplied in the housing to service an electrical actuator and/or a defroster heater pad.

Signal light assembly 138 includes a plurality of light-emitting diodes 152 positioned on circuit board 150. A variety of emitting sources may be used as light-emitting source 90, including, but not limited to, very high intensity amber and reddish-orange light-emitting diode (LED) sources, such as solid-state light-emitting diode (LED) sources utilizing double heterojunction AlGaAs/GaAs material technology, such as very high intensity red LED lamps T-1¾ (5 mm) HLMP-4100/4101, available from Hewlett Packard Corporation, Palo Alto, Calif., or which use transparent substrate aluminum indium gallium phosphide (AlInGaP) material technology, commercially available from Hewlett Packard Corporation, Palo Alto, Calif. under the designation T-1¾ (5 mm) HLMT-DL00, HLMT-CH00, HLMT-CL00, HLMT-CH15, HLMT-CL15 and HLMT-DH00 or high power AlInGaP amber and reddish-orange lamps under the designation HLMA-CH0O/-CL0O, HLMA-DG0O/-DH0O/-DL0O, HLMA-EH2O/-EL2O, HLMA-KH0W-KL00, and HLMA-QH0O/-QL0O, or which use InGaAlP material technology available from Toshiba Corporation of Latham, N.Y., such as under the designation TLRH180D or GaAlAs/GaAlAs LED sources available from Sharp Corporation Electronics Components Group such as Model No. GL6UR31T and Model No. GL6UR3T which are red LEDs. Light emittance colors provided by such solid-state sources include orange, yellow, amber, red, and reddish-orange, desirably without need of ancillary spectral filters. The preferred solid-state light-emitting diodes, at 25° C. or thereabouts, operate at a forward voltage of about 2 volts to about 5 volts; have a luminous intensity (measured at the peak of the spacial radiation pattern which may not be aligned with the mechanical axis of the source package) of a minimum, at 20 mA current, of about 500 to about 5000 mcd (typical, about 700 to about 7000 mcd); operate at a forward current of about 20 mA to about 50 mA; emit with a dominant wavelength (CIE Chromaticity Diagram) of about 530 nm to about 680 nm; and have a viewing angle $2\Theta_2$ (where $\Theta_2$ is the off-axis angle where the luminous intensity is one half the peak intensity) of about 5° to about 25°.

A lens assembly 154, which may be a polycarbonate or acrylic material, is positioned over signal light assembly 138. Lens assembly 154 may include a clear or sinusoidal optical surface 156 and a plurality of louvers 158. Louvers 158 and light-emitting diodes 152 are skewed away from the passenger compartment of the vehicle. In the illustrated embodiment, the light-emitting diodes and louvers are skewed at an angle of at least approximately 15°, more preferably approximately 25°, and most preferably approximately 25° to 30° from the longitudinal centerline of the vehicle, but preferably not more than about 45°. The purpose of the skewing is in order to allow the light radiated by the signal light assembly to be visible by drivers in vehicles to the side of vehicle 40, but to be shielded from the driver of the vehicle 40. This features prevents distraction to the driver of the vehicle equipped with the security lighting system. A cover member 160 encloses signal light assembly 138 and sinusoidal optical surface 156 by moisture-tight engagement with flange 146 of enclosure 116. In the illustrated embodiment, light-emitting diodes 152 are individually mounted at an angle on circuit board 150. In an alternative embodiment, light-emitting diodes 152 could be mounted upright, normal to circuit board 150, with the entire signal light assembly mounted at an angle with respect to the vehicle passenger compartment in order to provide proper skewing away from the driver of the vehicle equipped with the mirror assembly security system according to the invention. Also, when desired, a current limiting resistor can be mounted on circuit board 150 in series with the light-emitting diodes 152 to limit current therethrough and to mate to the 12-volt ignition/battery potential servicing the exterior mirror assembly.

Enclosure 116 is made from a heat-resistant material and is substantially moisture impervious. Preferably, a polymer material is used which has a heat distortion temperature (as measured by ASTM D 648 for a 12.7×12.7×6.4 mm specimen and at 1820 kPa) of at least approximately 80° C., more preferably at least approximately 100° C., and most preferably at least approximately 120° C. A mineral-filled or glass-filled nylon or polyester or acrylonitrile butadiene styrene (ABS) polymer may be utilized for enclosure 116. In the illustrated embodiment, enclosure 116 is made from polycarbonate with cover members 130 and 160 made from a polycarbonate or acrylic. The components of enclosure 116 may be assembled by conventional sonic welding, vibration welding, or by the use of suitable adhesives. Enclosure 116 is opaque, except for cover members 130 and 160, in order to shade light. The light module fits within the cavity defined within housing 34' by openings 108 and 110 in a manner which conforms to the styling and aerodynamic lines of the housing.

In an alternative embodiment illustrated in FIG. 25, a light module 104' is provided that includes a first downwardly directed light-transmitting opening 122 but does not include a rearwardly directed light-transmitting opening in the housing bezel. Light module 104' provides a puddle of light around the vehicle's doors, but does not include a signal light visible by drivers on the sides of the vehicle 40 equipped with light module 104'. In this manner, a mirror assembly security system, according to the invention, may be provided with a generally downwardly directed security light alone (104') or in combination with a signal light (104), which may illuminate in unison with the vehicle's turn signal, or brake lights, or both. Alternatively, signal light 104 may be provided as a stand-alone module packaged such as described herein and achieving the advantages in terms of modularity, ease of service/installation, weather resilience, etc., described herein. Thus, it is seen that the present invention provides an exceptionally flexible design which is easily adapted to various configurations desired by the vehicle manufacturers. Additionally, because the security system is provided in a unitary module having a unitary cover member/lens, the invention may be readily adapted to many vehicle housing designs without requiring extensive re-engineering of the vehicle exterior mirror housing.

Figure 26:
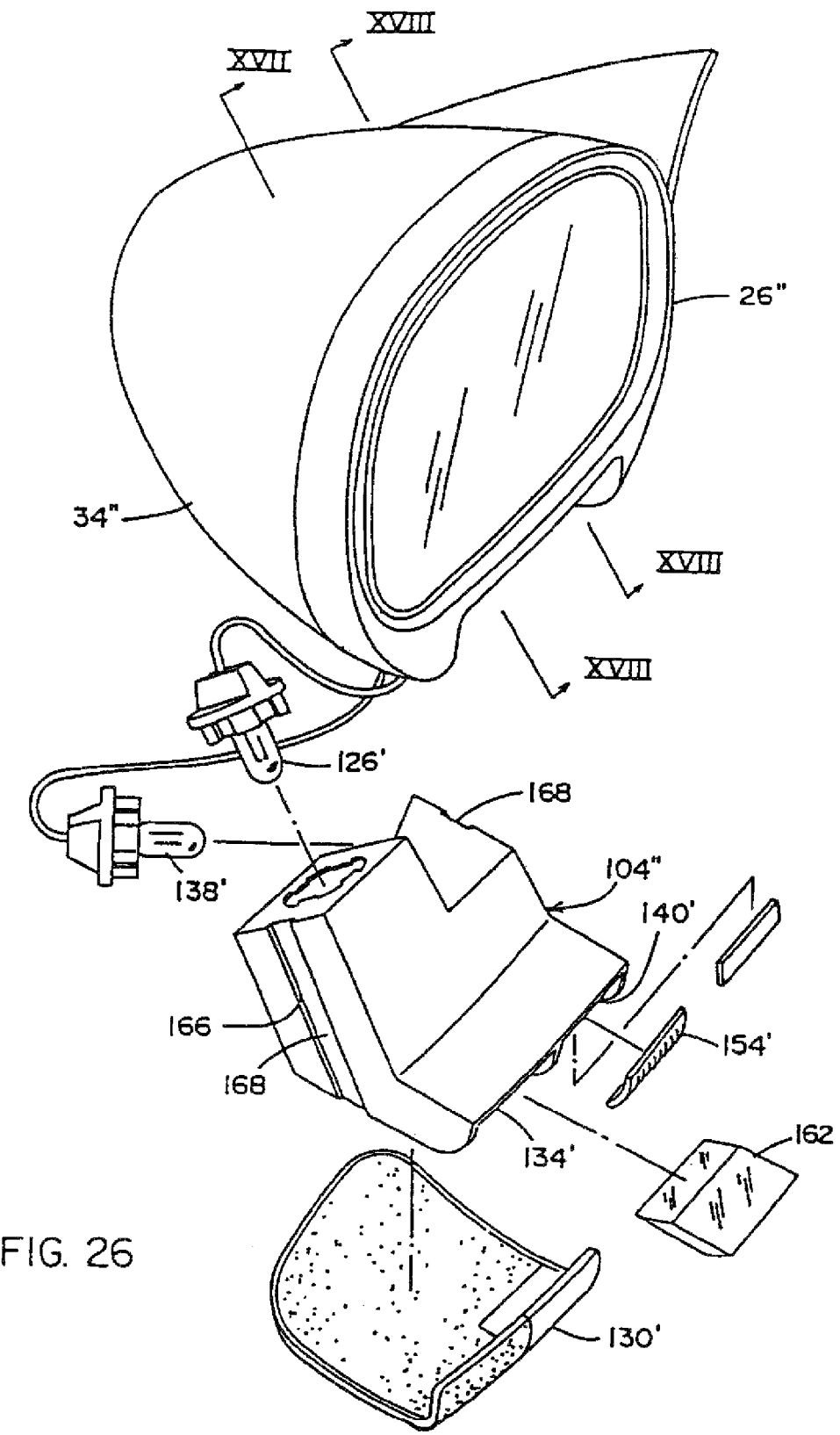
FIG. 26 is an exploded perspective view taken from the front of a mirror assembly of another alternative embodiment of the invention.
Figure 27:
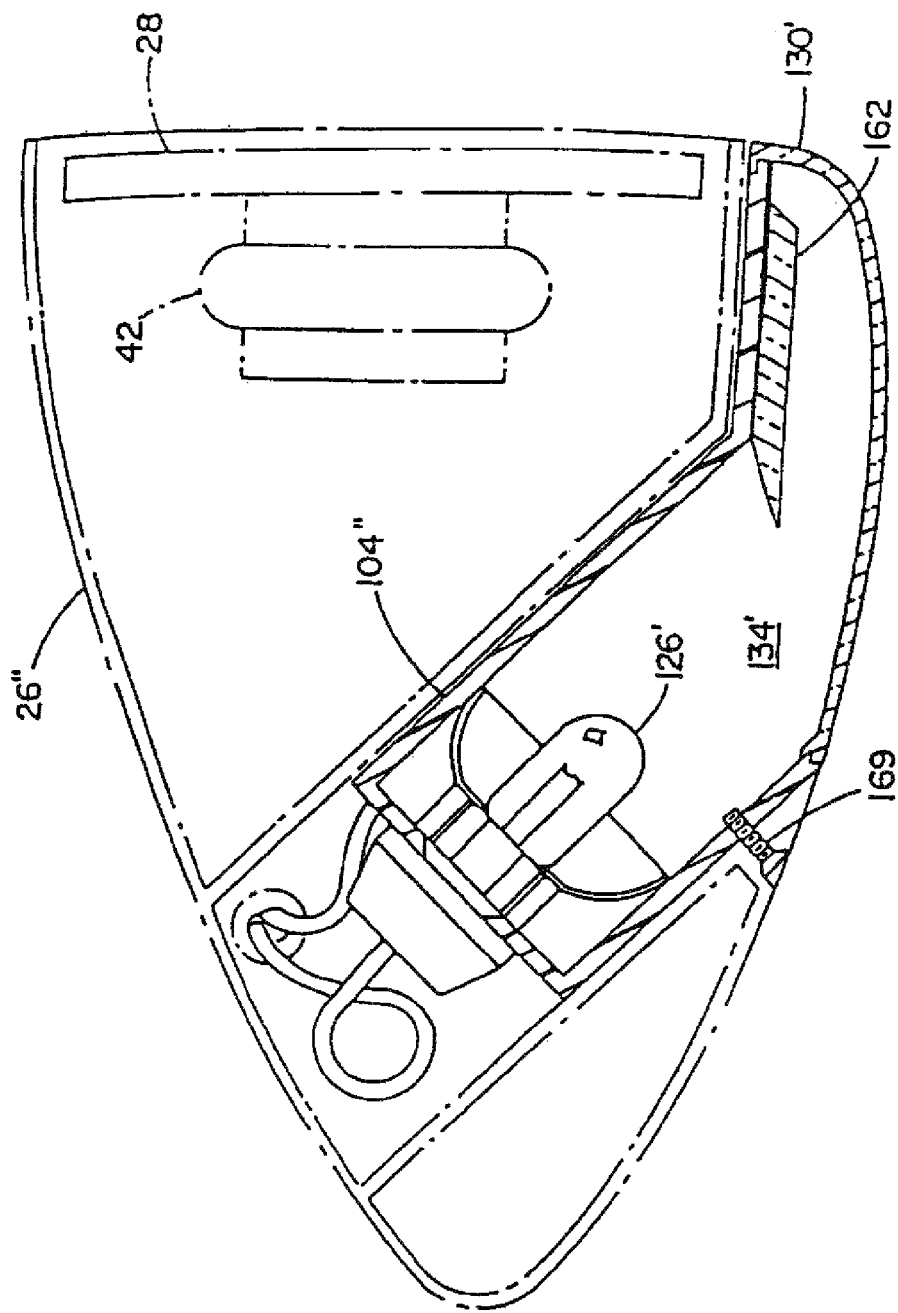
FIG. 27 is a sectional view taken along the lines XXVII-XXVII in FIG. 26.
Figure 28:
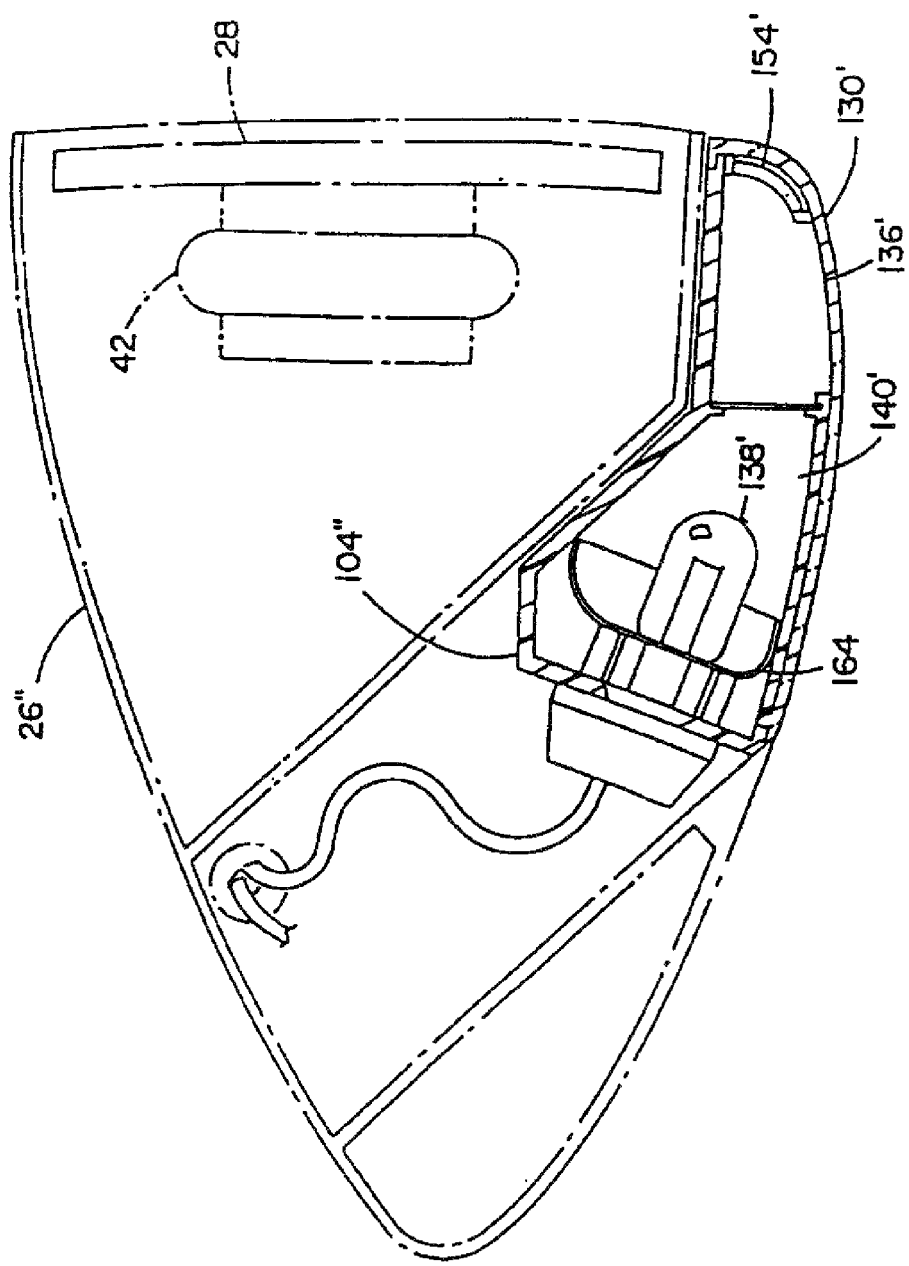
FIG. 28 is a sectional view taken along the lines XXVIII-XXVIII in FIG. 26.

In another embodiment, a light module 104" includes side-by-side cavities 134' and 140' (FIGS. 26-28). Cavity 134' terminates in a light-transmitting opening 122', which extends both downwardly and rearwardly with respect to the vehicle. A light-directing lens, or prism, 162 in cavity 134' captures a portion of the light radiated by light source 126' and directs it rearwardly of the vehicle. The puddle of light produced by light module 104" is capable of extending rearwardly of the vehicle because of the nature of light-transmitting opening 122' and the light redirecting effect of prism 162. The second cavity 140' in enclosure 116' includes a light-transmitting opening 136' which extends generally rearwardly of the vehicle. A light source 138' is positioned within cavity 140' and is surrounded by a reflector 164, which directs light through light-transmitting opening 136'. A diffuser assembly 154' includes an integral cover member and louvers in order to direct light radiated by light source 138' away from the passenger compartment of the vehicle equipped with light module 104". A unitary cover 130' extends over both openings 122' and 136'. Enclosure 116' includes a surface 166, which is configured with a groove 168, which mates with a tongue (not shown) in housing 34" of mirror assembly 36". The mating tongue-and-groove surface configuration is repeated on the surface of enclosure 116', which is opposite surface 166. The tongue-and-groove configuration at least partially retains light module 104" within housing 34" with a fastener, such as a threaded fastener 169, between an opening in housing 34" and extending into enclosure 116'. In the illustrated embodiment, light radiated from light source 126' through light-transmitting opening 122' provides a puddle of light adjacent the vehicle doors in order to produce a lighted security zone. The light radiated through light-transmitting opening 136 produced by light source 138' provides a signal indicator, which may be a turn signal indicator, or a brake signal indicator, or both a turn signal and brake signal indicator.

Figure 29:
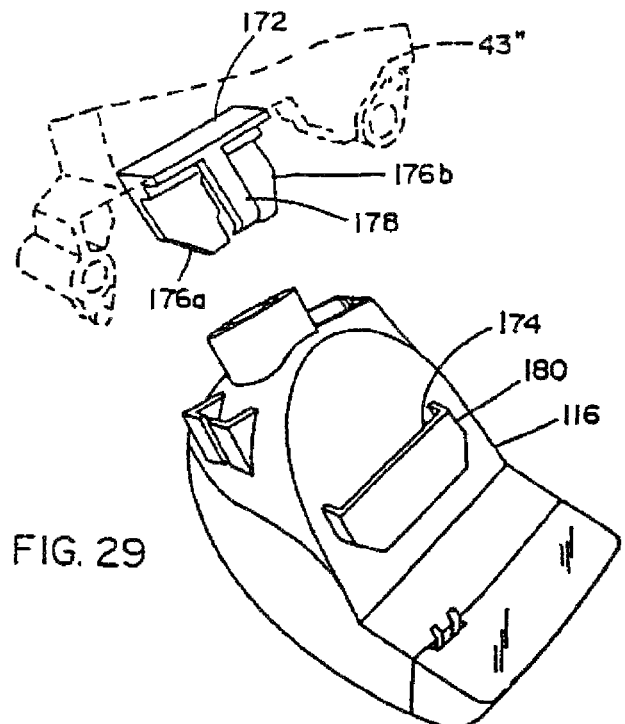
FIG. 29 is the same perspective view as FIG. 22 of another alternative embodiment.
Figure 30:
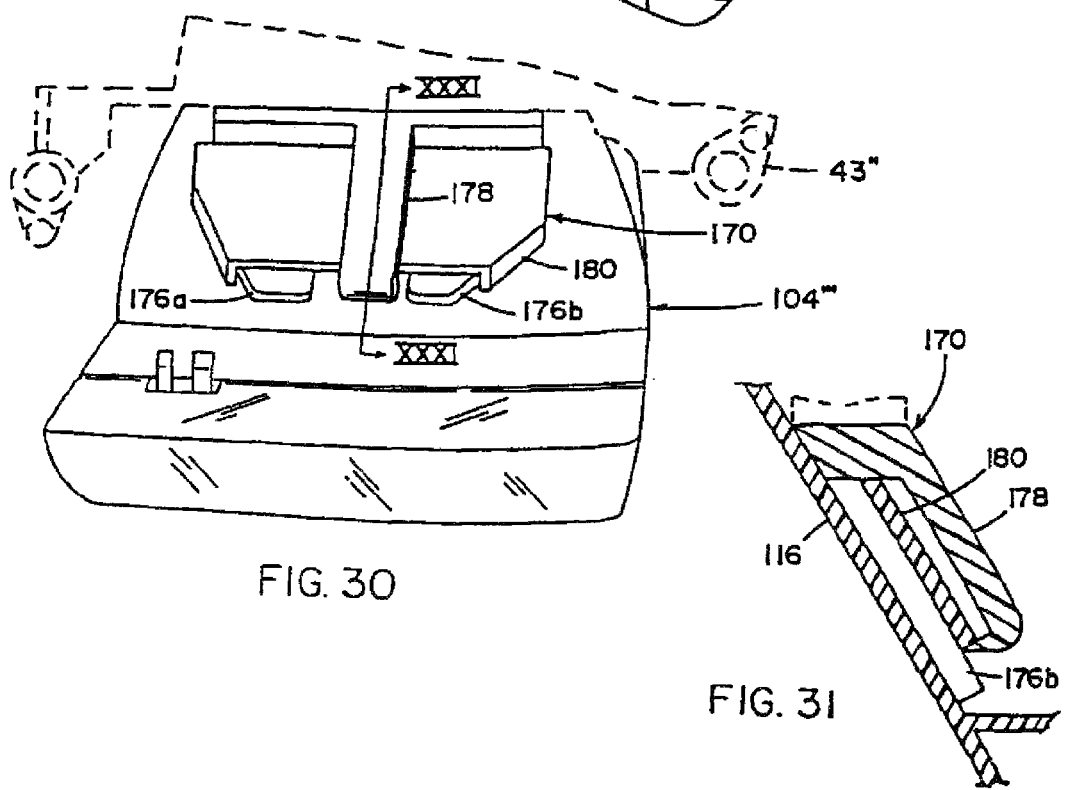
FIG. 30 is a front elevation of the mirror assembly in FIG. 29 illustrating the light module mounted to the support bracket.
Figure 31:
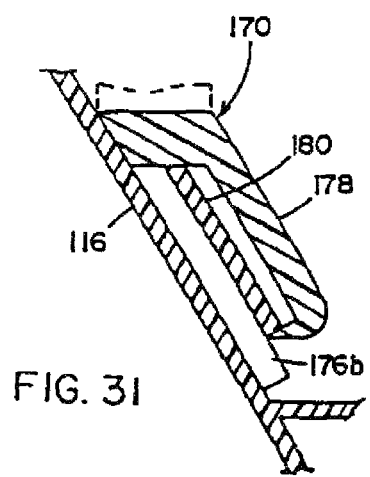
FIG. 31 is a sectional view taken along the lines XXXIII-XXXIII in FIG. 30.

In another embodiment, a light module 104''' includes a removable fastenerless attachment system 170 including a first member 172 mounted to bracket 43" and a second member 174 mounted to enclosure 116' (FIGS. 29-31). First member 172 is a clip connector having a pair of guide members 176a, 176b and a retaining prong 178 overlaying the guide members. Second member 174 includes a wall 180 defining a doghouse type receiving connector. Guide members 176a, 176b assist the sliding entry of first member 172 into the cavity defined within wall 180 so that prong 178 engages the wall to retain the clip within the cavity.

With fastenerless attachment system 170, module 104''' is easily and readily mounted by a simple insertion into the receiving opening in the mirror housing such that the first member is received by and engaged with the doghouse style receiving connector of the second member. To remove module 104''' for service, a tool, such as a flathead screwdriver, is inserted in the gap between the mirror element and the lamp module and prong 178 is raised, using a lift and twist motion, while the module is being pulled outwards from the mirror housing.

In a preferred embodiment, the lamp module of this invention incorporates a signal light that is a 12-watt #912 incandescent light source available from OSRAM/Sylvania, Hillsboro, N.H. (with about 12-candle power when operated at about 12.8 volts) mounted in a self-gasketing socket available from United Technologies Automotive, Detroit, Mich. under the trade name E25B-13A686-BA and fabricated of an electrical grade polyvinyl chloride injection molding compound such as to comply with Engineering Standard ESB-M4D317-A of Ford Motor Company, Dearborn, Mich., which is hereby incorporated herein by reference or from a thermoplastic rubber self-gasketing socket. The socket, in turn, is housed in a unitary enclosure, as described herein, fabricated of heat resistant polycarbonate supplied by General Electric Plastics, Woodstock, Ill. under the trade name ML4389 and meeting Ford Engineering Specification ESF-M4-D100-A, which is hereby incorporated herein by reference. The lens is made of acrylic supplied by General Electric Plastics under the 141-701 trade name. The LEDs in the signal light, of which six are used, are HLMA-DG00 high power AlInGa solid-state light-emitting diodes supplied by Hewlett Packard Corporation with a dominant wavelength at 622 nanometers, a peak wavelength at 630 nanometers, a 30° viewing angle, and a typical luminous efficiency, at 25° C., of 197 lumens/watt. When incorporated into an exterior mirror housing and mounted on a typical automobile, the ground illumination lamp height is approximately 30±5" from the ground surface, and, when operated at about 12 volts, the lamp light source illuminates an approximately 2-foot by 4-foot or thereabouts ground area adjacent the vehicle with a light level of at least about 10 lux and an average light level of approximately 40 lux.

Light modules of this invention, including a ground illumination lamp and a signal light incorporated into an exterior mirror assembly, were mounted and driven on vehicles through a variety of driving conditions and through varied environmental exposure, and were found to have the performance and environmental resilience required by automakers so as to be suitable for commercial use on vehicles.

Although illustrated herein as being located along the bottom rim of the exterior trim housing, other locations are possible for the signal light of the invention, including the top and outboard rim of the exterior rim housing, and even elsewhere on the exterior vehicle body as appropriate.

Should it be desired to vary the intensity of the signal lights so they are brightest during high ambient lighting conditions, such as on a sunny day, but so that they are dimmer when ambient conditions are lower, such as at night, the intensity of signal light can be modulated using a photosensor such as a photoresistor, photodiode, phototransistor, or their like. A photosensor that controls the intensity of the signal light so that it reduces its intensity during low ambient light driving conditions, such as by pulse width modulation on the electrical line powering the LEDs in the signal light, may be mounted integrally with the lamp module itself, or it may be part of the vehicle electronics itself, such as a photosensor mounted as a part of an automatic electrochromic mirror circuit, as part of a vehicle automatic headlamp activation circuit, as part of a headlamp daylight running light control circuit, or their like.

Also, the concepts of this invention are applicable to a variety of exterior vehicular mirror assembly constructions, including one-part designs, uni-body constructions, and their like, as known in the exterior mirror assembly art. The concepts of the invention are applicable to a variety of assemblies including assemblies that use a bracket as a distinct internal structure and assemblies that do not use a bracket but rather are bracket-less assemblies where the housing itself serves as a structural element with means such as on the walls of the housing for securing an actuator and for receiving a lamp module.

Also, although desirably and preferably finding utility as a security light, the exterior mirror assembly light modules of this invention are also useful for other purposes such as providing for a courtesy exterior light and a general ground illumination light when such lighting may be desired such as when a door is opening, a key is inserted, or a keyboard entry is touched, or when approach of a person to a vehicle is detected such as by voice activation, proximity detection and their like. Also, light modules using the principles and concepts described herein could be provided for mounting on the vehicle other than within an exterior mirror assembly, such as under a door within a door well or under a door body panel so as to provide ground illumination directly under a door whenever said door is opened.

Changes and modifications in the specifically described embodiments can be carried out without departing from the principles of the invention, which is intended to be limited only by the scope of the appended claims, as interpreted according to the principles of patent law including the doctrine of equivalents.

What is claimed is:

1. A lighted exterior mirror assembly configured for attachment at a side of a vehicle, said lighted exterior mirror assembly comprising:

a housing, wherein said housing houses a reflectance element;

wherein, when said lighted exterior rearview mirror assembly is attached at a side of a vehicle equipped with said lighted exterior mirror assembly, said reflectance element is movably positionable via an electrically-powered actuator by a driver of the equipped vehicle to adjust its rearward field of view;

a breakaway joint;

wherein at least one wire passes through said breakaway joint and wherein said at least one wire supplies electrical power to at least one of (i) said actuator and (ii) a defroster heater pad for said reflectance element;

a ground illumination lamp disposed at a portion of said lighted exterior mirror assembly;

wherein said ground illumination lamp is disposed at said portion of said lighted exterior mirror assembly separate from said reflectance element whereby movement of said reflectance element is independent of said ground illumination light;

wherein said ground illumination lamp comprises a substantially moisture-impervious unit having an enclosure and having a lens that is permanently joined with said enclosure;

wherein said ground illumination lamp comprises a light source;

wherein said light source is disposed within said enclosure behind said lens and wherein, when said lighted exterior mirror assembly is attached at the side of the equipped vehicle and when said light source is electrically powered, said light source emits light that passes through said lens and illuminates a ground area adjacent the side of the equipped vehicle; and wherein, when said lighted exterior mirror assembly is attached at the side of the equipped vehicle and when said light source is electrically powered, said ground illumination lamp illuminates at least a portion of the illuminated ground area with a luminance of at least approximately 5 lux.

2. The lighted exterior mirror assembly of claim 1, wherein said light source comprises at least one light emitting diode.

3. The lighted exterior mirror assembly of claim 2, wherein, when said lighted exterior mirror assembly is attached at the side of the equipped vehicle and when said at least one light emitting diode is electrically powered, said at least one light emitting diode operates at a forward voltage of at least about 2 volts.

4. The lighted exterior mirror assembly of claim 3, wherein, when said lighted exterior mirror assembly is attached at the side of the equipped vehicle and when said at least one light emitting diode is electrically powered, said at least one light emitting diode operates at a forward current of at least about 20 mA.

5. The lighted exterior mirror assembly of claim 4, wherein, when said at least one light emitting diode operates at a forward voltage of at least about 2 volts and a forward current of at least about 20 mA, said at least one light emitting diode has a luminous intensity of least about 500 mcd.

6. The lighted exterior mirror assembly of claim 2, wherein said at least one light emitting diode is operated via pulse width modulation.

7. The lighted exterior mirror assembly of claim 2, wherein a resistor is connected in series with said at least one light emitting diode.

8. The lighted exterior mirror assembly of claim 1, wherein said light source comprises a plurality of light emitting diodes.

9. The lighted exterior mirror assembly of claim 1, wherein said enclosure comprises a heat-resistant material.

10. The lighted exterior mirror assembly of claim 9, wherein said heat-resistant material has a heat distortion temperature of at least approximately 80 degrees C.

11. The lighted exterior mirror assembly of claim 1, wherein said lens is joined at said enclosure by at least one of (i) sonic welding, (ii) vibration welding and (iii) an adhesive.

12. The lighted exterior mirror assembly of claim 1, wherein said lens comprises at least one of a polycarbonate material and an acrylic material.

13. The lighted exterior mirror assembly of claim 1, wherein said enclosure is opaque.

14. The lighted exterior mirror assembly of claim 1, wherein said lens comprises a diffuser element.

15. The lighted exterior mirror assembly of claim 1, wherein said lighted exterior mirror assembly comprises a foldable portion and a non-foldable portion, and wherein said non-foldable portion is configured to mount at the side of the equipped vehicle and wherein said foldable portion includes said reflectance element.

16. The lighted exterior mirror assembly of claim 15, wherein said reflectance element comprises an electrochromic reflectance element and wherein at least one wire passing though said breakaway joint supplies signals to control the reflectivity of said electrochromic reflectance element.

17. The lighted exterior mirror assembly of claim 1, wherein said portion of said lighted exterior mirror assembly comprises a lower portion of said lighted exterior mirror assembly when said lighted exterior mirror assembly is normally attached at the side of the equipped vehicle.

18. The lighted exterior mirror assembly of claim 17, wherein said lower portion of said lighted exterior mirror assembly comprises a lower portion of said housing of said lighted exterior mirror assembly when said lighted exterior mirror assembly is normally attached at the side of the equipped vehicle.

19. The lighted exterior mirror assembly of claim 18, wherein said ground illumination lamp is disposed at least partially within said lower portion of said housing in a manner that conforms to the styling and aerodynamic lines of said housing.

20. The lighted exterior mirror assembly of claim 19, wherein said ground illumination lamp is disposed at least partially within a cavity of said lower portion of said housing.

21. The lighted exterior mirror assembly of claim 17, wherein said lens is disposed at an opening at said lower portion of said lighted exterior mirror assembly.

22. The lighted exterior mirror assembly of claim 21, wherein said opening at said lower portion of said lighted exterior mirror assembly at least faces generally downwardly when said lighted exterior mirror assembly is normally attached at the side of the equipped vehicle.

23. The lighted exterior mirror assembly of claim 22, wherein said opening at said lower portion of said lighted exterior mirror assembly faces partially rearwardly when said lighted exterior mirror assembly is normally attached at the side of the equipped vehicle.

24. The lighted exterior mirror assembly of claim 17, wherein said ground illumination lamp is disposed at least partially within said lower portion of said lighted exterior mirror assembly in a manner that conforms to the styling and aerodynamic lines of said lighted exterior mirror assembly.

25. The lighted exterior mirror assembly of claim 1, wherein said ground illumination lamp is disposed at least partially within said portion of said lighted exterior mirror assembly in a manner that conforms to the styling and aerodynamic lines of said lighted exterior mirror assembly.

26. The lighted exterior mirror assembly of claim 25, wherein said ground illumination lamp is disposed at least partially within a cavity of said portion of said lighted exterior mirror assembly.

27. The lighted exterior mirror assembly of claim 25, wherein said lens is disposed at an opening at said portion of said lighted exterior mirror assembly.

28. The lighted exterior mirror assembly of claim 1, wherein said lens affects the distribution of light emitted from said light source when said light source is electrically powered.

29. The lighted exterior mirror assembly of claim 1, wherein said ground illumination lamp and said portion of said lighted exterior mirror assembly comprise mating configurations for disposing said ground illumination lamp at said portion of said lighted exterior mirror assembly.

30. The lighted exterior mirror assembly of claim 1, wherein illumination of the ground area adjacent the side of the equipped vehicle comprises a puddle of light at the ground area adjacent a front side door at the side of the equipped vehicle.

31. The lighted exterior mirror assembly of claim 30, wherein illumination of the ground area adjacent the side of the equipped vehicle comprises a substantially uniform puddle of light at the ground area adjacent a front side door at the side of the equipped vehicle.

32. The lighted exterior mirror assembly of claim 30, wherein said light source, when electrically powered, provides a relatively wide light pattern at the illuminated ground area adjacent a front side door at the side of the equipped vehicle.

33. The lighted exterior mirror assembly of claim 30, wherein the puddle of light extends at least to a ground area adjacent a rear side door at the side of the equipped vehicle.

34. The lighted exterior mirror assembly of claim 33, wherein the puddle of light extends at least to a ground area adjacent the rear of the equipped vehicle.

35. The lighted exterior mirror assembly of claim 1, wherein, when said lighted exterior mirror assembly is attached at the side of the equipped vehicle and when said light source is electrically powered, said ground illumination lamp illuminates at least an approximately 2-foot by 4-foot ground area adjacent the side of the equipped vehicle.

36. The lighted exterior mirror assembly of claim 1, wherein, when said lighted exterior mirror assembly is attached at the side of the equipped vehicle and when said light source is electrically powered, said ground illumination lamp illuminates at least a portion of the illuminated ground area with a luminance of at least approximately 10 lux.

37. The lighted exterior mirror assembly of claim 1, wherein, when said lighted exterior mirror assembly is attached at the side of the equipped vehicle and when said light source is electrically powered, said ground illumination lamp illuminates at least a portion of the illuminated ground area with a luminance of at least approximately 20 lux.

38. The lighted exterior mirror assembly of claim 1, wherein said light source, when said lighted exterior mirror assembly is attached at the side of the equipped vehicle and when said light source is electrically powered, emits at least about 5-candle power of light.

39. The lighted exterior mirror assembly of claim 1, wherein said light source, when said lighted exterior mirror assembly is attached at the side of the equipped vehicle and when said light source is electrically powered, emits up to about 15-candle power of light.

40. The lighted exterior mirror assembly of claim 1, wherein said light source, when said lighted exterior mirror assembly is attached at the side of the equipped vehicle and when said light source is electrically powered, emits up to about 32-candle power of light.

41. The lighted exterior mirror assembly of claim 1, wherein, when said lighted exterior mirror assembly is attached at the side of the equipped vehicle, said electrically-powered actuator is operable by the driver of the equipped vehicle from within a cabin of the equipped vehicle to position said reflectance element to provide a desired field of view to the driver of the equipped vehicle.

42. The lighted exterior mirror assembly of claim 1, wherein said ground illumination lamp projects white light when said light source is electrically powered.

43. A lighted exterior mirror assembly configured for attachment at a side of a vehicle, said lighted exterior mirror assembly comprising:
a housing, wherein said housing houses a reflectance element;
wherein, when said lighted exterior rearview mirror assembly is attached at a side of a vehicle equipped with said lighted exterior mirror assembly, said reflectance element is movably positionable via an electrically-powered actuator by a driver of the equipped vehicle to adjust its rearward field of view;
a breakaway joint;
wherein at least one wire passes through said breakaway joint and wherein said at least one wire supplies electrical power to at least one of (i) said actuator and (ii) a defroster heater pad for said reflectance element;
a ground illumination lamp disposed at a portion of said lighted exterior mirror assembly;
wherein said ground illumination lamp is disposed at said portion of said lighted exterior mirror assembly separate from said reflectance element whereby movement of said reflectance element is independent of said ground illumination light;
wherein said ground illumination lamp comprises a substantially moisture-impervious unit having an enclosure and having a lens that is permanently joined with said enclosure;
wherein said ground illumination lamp comprises a light source;
wherein said light source is disposed within said enclosure behind said lens and wherein, when said lighted exterior mirror assembly is attached at the side of the equipped vehicle and when said light source is electrically powered, said light source emits light that passes through said lens and illuminates a ground area adjacent the side of the equipped vehicle; and
wherein, when said lighted exterior mirror assembly is attached at the side of the equipped vehicle and when said light source is electrically powered, said ground illumination lamp illuminates at least an approximately 2-foot by 4-foot ground area adjacent the side of the equipped vehicle.

44. The lighted exterior mirror assembly of claim 43, wherein, when said lighted exterior mirror assembly is attached at the side of the equipped vehicle and when said light source is electrically powered, illumination of the ground area adjacent the side of the equipped vehicle comprises a puddle of light at the ground area adjacent the side of the equipped vehicle.

45. The lighted exterior mirror assembly of claim 44, wherein illumination of the ground area adjacent the side of the equipped vehicle comprises a substantially uniform puddle of light at the ground area adjacent a front side door at the side of the equipped vehicle.

46. The lighted exterior mirror assembly of claim 44, wherein the puddle of light at least one of (i) extends at least to a ground area adjacent a rear side door at the side of the equipped vehicle, and (ii) extends at least to a ground area adjacent the rear of the equipped vehicle.

47. The lighted exterior mirror assembly of claim 43, wherein said light source, when said lighted exterior mirror assembly is attached at the side of the equipped vehicle and when said light source is electrically powered, emits at least about 5-candle power of light.

48. The lighted exterior mirror assembly of claim 43, wherein, when said lighted exterior mirror assembly is attached at the side of the equipped vehicle and when said light source is electrically powered, said ground illumination lamp illuminates at least a portion of the illuminated ground area with a luminance of at least approximately 5 lux.

49. The lighted exterior mirror assembly of claim 43, wherein said portion of said lighted exterior mirror assembly comprises a lower portion of said lighted exterior mirror assembly when said lighted exterior mirror assembly is normally attached at the side of the equipped vehicle.

50. The lighted exterior mirror assembly of claim 49, wherein said lens is disposed at an opening at said lower portion of said lighted exterior mirror assembly when said lighted exterior mirror assembly is normally attached at the side of the equipped vehicle, and wherein said opening at said lower portion of said lighted exterior mirror assembly at least faces at least one of (i) generally downwardly when said lighted exterior mirror assembly is normally attached at the side of the equipped vehicle and (ii) partially rearwardly when said lighted exterior mirror assembly is normally attached at the side of the equipped vehicle.

51. The lighted exterior mirror assembly of claim 43, wherein said lens affects the distribution of light emitted from said light source when said light source is electrically powered.

52. The lighted exterior mirror assembly of claim 43, wherein said lens is joined at said enclosure by at least one of (i) sonic welding, (ii) vibration welding and (iii) an adhesive.

53. The lighted exterior mirror assembly of claim 43, wherein said ground illumination lamp is disposed at least partially within said portion of said lighted exterior mirror assembly in a manner that conforms to the styling and aerodynamic lines of said lighted exterior mirror assembly.

54. The lighted exterior mirror assembly of claim 43, wherein said ground illumination lamp and said portion of said lighted exterior mirror assembly comprise mating configurations for disposing said ground illumination lamp at said portion of said lighted exterior mirror assembly.

55. The lighted exterior mirror assembly of claim 43, wherein said ground illumination lamp projects white light when said light source is electrically powered.

56. A lighted exterior mirror assembly configured for attachment at a side of a vehicle, said lighted exterior mirror assembly comprising:
- a housing, wherein said housing houses a reflectance element;
- wherein, when said lighted exterior rearview mirror assembly is attached at a side of a vehicle equipped with said lighted exterior mirror assembly, said reflectance element is movably positionable via an electrically-powered actuator by the driver of the equipped vehicle to adjust its rearward field of view;
- a breakaway joint;
- wherein at least one wire passes through said breakaway joint and wherein said at least one wire supplies electrical power to at least one of (i) said actuator and (ii) a defroster heater pad for said reflectance element;
- a ground illumination lamp disposed at a portion of said lighted exterior mirror assembly;
- wherein said ground illumination lamp is disposed at said portion of said lighted exterior mirror assembly separate from said reflectance element whereby movement of said reflectance element is independent of said ground illumination light;
- wherein said ground illumination lamp comprises a substantially moisture-impervious unit having an enclosure and having a lens that is permanently joined with said enclosure;
- wherein said ground illumination lamp comprises a light source;
- wherein said light source comprises at least one light emitting diode;
- wherein, when said lighted exterior mirror assembly is attached at the side of the equipped vehicle and when said at least one light emitting diode is electrically powered, said at least one light emitting diode operates at a forward current of at least about 20 mA;
- wherein said at least one light emitting diode is disposed within said enclosure behind said lens and wherein, when said lighted exterior mirror assembly is attached at the side of the equipped vehicle and when said at least one light emitting diode is electrically powered, said at least one light emitting diode emits light that passes through said lens and illuminates a ground area adjacent the side of the equipped vehicle; and
- wherein, when said lighted exterior mirror assembly is attached at the side of the equipped vehicle and when said at least one light emitting diode is electrically powered, said ground illumination lamp illuminates at least an approximately 2-foot by 4-foot ground area adjacent the side of the equipped vehicle.

57. The lighted exterior mirror assembly of claim 56, wherein, when said lighted exterior mirror assembly is attached at the side of the equipped vehicle and when said at least one light emitting diode is electrically powered, said at least one light emitting diode operates at a forward voltage of at least about 2 volts.

58. The lighted exterior mirror assembly of claim 57, wherein, when said at least one light emitting diode operates at a forward voltage of at least about 2 volts and a forward current of at least about 20 mA, said at least one light emitting diode has a luminous intensity of least about 500 mcd.

59. The lighted exterior mirror assembly of claim 56, wherein said at least one light emitting diode comprises a plurality of light emitting diodes.

60. The lighted exterior mirror assembly of claim 56, wherein said lens is joined at said enclosure by at least one of (i) sonic welding, (ii) vibration welding and (iii) an adhesive.

61. The lighted exterior mirror assembly of claim 56, wherein said portion of said lighted exterior mirror assembly comprises a lower portion of said lighted exterior mirror assembly when said lighted exterior mirror assembly is normally attached at the side of the equipped vehicle.

62. The lighted exterior mirror assembly of claim 61, wherein said lens is disposed at an opening at said lower portion of said lighted exterior mirror assembly when said lighted exterior mirror assembly is normally attached at the side of the equipped vehicle, and wherein said opening at said lower portion of said lighted exterior mirror assembly at least faces at least one of (i) generally downwardly when said lighted exterior mirror assembly is normally attached at the side of the equipped vehicle and (ii) partially rearwardly when said lighted exterior mirror assembly is normally attached at the side of the equipped vehicle.

63. The lighted exterior mirror assembly of claim 56, wherein, when said lighted exterior mirror assembly is attached at the side of the equipped vehicle and when said at least one light emitting diode is electrically powered, illumination of the ground area adjacent the side of the equipped vehicle comprises a puddle of light at the ground area adjacent the side of the equipped vehicle.

64. The lighted exterior mirror assembly of claim 63, wherein illumination of the ground area adjacent the side of the equipped vehicle comprises a substantially uniform puddle of light at the ground area adjacent a front side door at the side of the equipped vehicle.

65. The lighted exterior mirror assembly of claim 63, wherein the puddle of light at least one of (i) extends at least to a ground area adjacent a rear side door at the side of the equipped vehicle, and (ii) extends at least to a ground area adjacent the rear of the equipped vehicle.

66. The lighted exterior mirror assembly of claim 56, wherein said at least one light emitting diode, when said lighted exterior mirror assembly is attached at the side of the equipped vehicle and when said at least one light emitting diode is electrically powered, emits at least about 5-candle power of light.

67. The lighted exterior mirror assembly of claim 56, wherein, when said lighted exterior mirror assembly is attached at the side of the equipped vehicle and when said at least one light emitting diode is electrically powered, said ground illumination lamp illuminates at least a portion of the illuminated ground area with a luminance of at least approximately 5 lux.

68. The lighted exterior mirror assembly of claim 56, wherein said portion of said lighted exterior mirror assembly comprises a lower portion of said lighted exterior mirror assembly when said lighted exterior mirror assembly is normally attached at the side of the equipped vehicle.

69. The lighted exterior mirror assembly of claim 56, wherein said lens affects the distribution of light emitted from said at least one light emitting diode when said at least one light emitting diode is electrically powered.

70. The lighted exterior mirror assembly of claim 56, wherein said lens is joined at said enclosure by at least one of (i) sonic welding, (ii) vibration welding and (iii) an adhesive.

71. The lighted exterior mirror assembly of claim 56, wherein said ground illumination lamp is disposed at least partially within said portion of said lighted exterior mirror assembly in a manner that conforms to the styling and aerodynamic lines of said lighted exterior mirror assembly.

72. The lighted exterior mirror assembly of claim 56, wherein said ground illumination lamp and said portion of said lighted exterior mirror assembly comprise mating configurations for disposing said ground illumination lamp at said portion of said lighted exterior mirror assembly.

73. The lighted exterior mirror assembly of claim 56, wherein said ground illumination lamp projects white light when said at least one light emitting diode is electrically powered.

74. A lighted exterior mirror assembly configured for attachment at a side of a vehicle, said lighted exterior mirror assembly comprising:
   a housing, wherein said housing houses a reflectance element;
   wherein, when said lighted exterior rearview mirror assembly is attached at a side of a vehicle equipped with said lighted exterior mirror assembly, said reflectance element is movably positionable via an electrically-powered actuator by the driver of the equipped vehicle to adjust its rearward field of view;
   a breakaway joint;
   wherein at least one wire passes through said breakaway joint and wherein said at least one wire supplies electrical power to at least one of (i) said actuator and (ii) a defroster heater pad for said reflectance element;
   a ground illumination lamp disposed at a portion of said lighted exterior mirror assembly;
   wherein said ground illumination lamp is disposed at said portion of said lighted exterior mirror assembly separate from said reflectance element whereby movement of said reflectance element is independent of said ground illumination light;
   wherein said ground illumination lamp comprises a substantially moisture-impervious unit having an enclosure and having a lens that is permanently joined with said enclosure;
   wherein said ground illumination lamp comprises a light source;
   wherein said light source is disposed within said enclosure behind said lens and wherein, when said lighted exterior mirror assembly is attached at the side of the equipped vehicle and when said light source is electrically powered, said light source emits light that passes through said lens and illuminates a ground area adjacent the side of the equipped vehicle; and
   wherein, when said lighted exterior mirror assembly is attached at the side of the equipped vehicle and when said light source is electrically powered, said ground illumination lamp illuminates at least a portion of the illuminated ground area with a luminance of at least approximately 5 lux.

75. The lighted exterior mirror assembly of claim 74, wherein said lens is joined at said enclosure by at least one of (i) sonic welding, (ii) vibration welding and (iii) an adhesive.

76. The lighted exterior mirror assembly of claim 74, wherein said portion of said lighted exterior mirror assembly comprises a lower portion of said lighted exterior mirror assembly when said lighted exterior mirror assembly is normally attached at the side of the equipped vehicle.

77. The lighted exterior mirror assembly of claim 76, wherein said lens is disposed at an opening at said lower portion of said lighted exterior mirror assembly when said lighted exterior mirror assembly is normally attached at the side of the equipped vehicle, and wherein said opening at said lower portion of said lighted exterior mirror assembly at least faces at least one of (i) generally downwardly when said lighted exterior mirror assembly is normally attached at the side of the equipped vehicle and (ii) partially rearwardly when said lighted exterior mirror assembly is normally attached at the side of the equipped vehicle.

78. The lighted exterior mirror assembly of claim 74, wherein, when said lighted exterior mirror assembly is attached at the side of the equipped vehicle and when said at least one light emitting diode is electrically powered, illumination of the ground area adjacent the side of the equipped vehicle comprises a puddle of light at the ground area adjacent the side of the equipped vehicle.

79. The lighted exterior mirror assembly of claim 78, wherein illumination of the ground area adjacent the side of the equipped vehicle comprises a substantially uniform puddle of light at the ground area adjacent a front side door at the side of the equipped vehicle.

80. The lighted exterior mirror assembly of claim 78, wherein the puddle of light at least one of (i) extends at least to a ground area adjacent a rear side door at the side of the equipped vehicle, and (ii) extends at least to a ground area adjacent the rear of the equipped vehicle.

81. The lighted exterior mirror assembly of claim 74, wherein said light source, when said lighted exterior mirror assembly is attached at the side of the equipped vehicle and when said light source is electrically powered, emits at least about 5-candle power of light, and wherein, when said lighted exterior mirror assembly is attached at the side of the equipped vehicle and when said light source is electrically powered, said ground illumination lamp illuminates at least a portion of the illuminated ground area with a luminance of at least approximately 10 lux.

82. The lighted exterior mirror assembly of claim 74, wherein said portion of said lighted exterior mirror assembly comprises a lower portion of said lighted exterior mirror assembly when said lighted exterior mirror assembly is normally attached at the side of the equipped vehicle.

83. The lighted exterior mirror assembly of claim 74, wherein said lens affects the distribution of light emitted from said light source when said light source is electrically powered.

84. The lighted exterior mirror assembly of claim 74, wherein said lens is joined at said enclosure by at least one of (i) sonic welding, (ii) vibration welding and (iii) an adhesive.

85. The lighted exterior mirror assembly of claim 74, wherein said ground illumination lamp is disposed at least partially within said portion of said lighted exterior mirror assembly in a manner that conforms to the styling and aerodynamic lines of said lighted exterior mirror assembly.

86. The lighted exterior mirror assembly of claim 74, wherein said ground illumination lamp and said portion of said lighted exterior mirror assembly comprise mating configurations for disposing said ground illumination lamp at said portion of said lighted exterior mirror assembly.

87. The lighted exterior mirror assembly of claim 74, wherein said ground illumination lamp projects white light when said light source is electrically powered.

88. A lighted exterior mirror assembly configured for attachment at a side of a vehicle, said lighted exterior mirror assembly comprising:
   a housing, wherein said housing houses a reflectance element;
   wherein, when said lighted exterior rearview mirror assembly is attached at a side of a vehicle equipped with said lighted exterior mirror assembly, said reflectance element is movably positionable via an electrically-powered actuator by the driver of the equipped vehicle to adjust its rearward field of view;
   a breakaway joint;
   wherein at least one wire passes through said breakaway joint and wherein said at least one wire supplies electrical power to at least one of (i) said actuator and (ii) a defroster heater pad for said reflectance element;

a ground illumination lamp disposed at a portion of said lighted exterior mirror assembly;

wherein said ground illumination lamp is disposed at said portion of said lighted exterior mirror assembly separate from said reflectance element whereby movement of said reflectance element is independent of said ground illumination light;

wherein said ground illumination lamp comprises a substantially moisture-impervious unit having an enclosure and having a lens that is permanently joined with said enclosure;

wherein said ground illumination lamp comprises a light source;

wherein said light source is disposed within said enclosure behind said lens and wherein, when said lighted exterior mirror assembly is attached at the side of the equipped vehicle and when said light source is electrically powered, said light source emits light that passes through said lens and illuminates a ground area adjacent the side of the equipped vehicle;

wherein said enclosure comprises at least one of (i) an opaque enclosure, (ii) an enclosure comprising a heat resistant material and (iii) an enclosure comprising a heat resistant material having a heat distortion temperature of at least approximately 80 degrees C.; and wherein said ground illumination lamp projects white light when said light source is electrically powered.

89. The lighted exterior mirror assembly of claim 88, wherein, when said lighted exterior mirror assembly is attached at the side of the equipped vehicle and when said light source is electrically powered, said ground illumination lamp illuminates at least a portion of the illuminated ground area with a luminance of at least approximately 5 lux.

90. The lighted exterior mirror assembly of claim 88, wherein said light source, when said lighted exterior mirror assembly is attached at the side of the equipped vehicle and when said light source is electrically powered, emits at least about 5-candle power of light.

91. The lighted exterior mirror assembly of claim 88, wherein said ground illumination lamp is disposed at least partially within said portion of said lighted exterior mirror assembly in a manner that conforms to the styling and aerodynamic lines of said lighted exterior mirror assembly.

92. The lighted exterior mirror assembly of claim 88, wherein said ground illumination lamp and said portion of said lighted exterior mirror assembly comprise mating configurations for disposing said ground illumination lamp at said portion of said lighted exterior mirror assembly.

93. The lighted exterior mirror assembly of claim 88, wherein, when said lighted exterior mirror assembly is attached at the side of the equipped vehicle and when said at least one light emitting diode is electrically powered, illumination of the ground area adjacent the side of the equipped vehicle comprises a puddle of light at the ground area adjacent the side of the equipped vehicle, and wherein the puddle of light at least one of (i) extends at least to a ground area adjacent a front side door at the side of the equipped vehicle, (ii) extends at least to a ground area adjacent a rear side door at the side of the equipped vehicle, and (iii) extends at least to a ground area adjacent the rear of the equipped vehicle.

\* \* \* \* \*

UNITED STATES PATENT AND TRADEMARK OFFICE
CERTIFICATE OF CORRECTION

PATENT NO. : 8,393,766 B2
APPLICATION NO. : 13/595522
DATED : March 12, 2013
INVENTOR(S) : Todd W. Pastrick It is certified that error appears in the above-identified patent and that said Letters Patent is hereby corrected as shown below:

Title page, item [73]:
Assignee: "Manga" should be --Magna--

In the Specification:

Column 6:
Line 24, "mirror" should be --minor--

Column 10:
Line 35, "KHOW" should be --KH00--

Signed and Sealed this
Twenty-fifth Day of February, 2014

Michelle K. Lee
*Deputy Director of the United States Patent and Trademark Office*